(12) United States Patent
Boorman et al.

(10) Patent No.: US 8,694,184 B1
(45) Date of Patent: Apr. 8, 2014

(54) METHODS, SYSTEMS, AND APPARATUS FOR LAYERED AND MULTI-INDEXED FLIGHT MANAGEMENT INTERFACE

(75) Inventors: Daniel J. Boorman, Woodinville, WA (US); Randall J. Mumaw, Seattle, WA (US); Victor A. Riley, Point Roberts, WA (US)

(73) Assignee: The Boeing Company, Chicago, IL (US)

( * ) Notice: Subject to any disclaimer, the term of this patent is extended or adjusted under 35 U.S.C. 154(b) by 689 days.

(21) Appl. No.: 12/887,366

(22) Filed: Sep. 21, 2010

(51) Int. Cl.
*G06F 3/048* (2013.01)
*G06F 19/00* (2011.01)

(52) U.S. Cl.
USPC .............. 701/14; 701/3; 340/971; 340/973; 340/945; 715/810; 715/825; 715/853

(58) Field of Classification Search
USPC .............. 701/36, 3, 14, 9; 715/777, 780, 853, 715/854, 738, 810, 825, 841, 737, 733; 340/945, 971, 979; 244/221; 703/7, 8
See application file for complete search history.

(56) References Cited

U.S. PATENT DOCUMENTS

| | | | |
|---|---|---|---|
| 5,715,163 A | | 2/1998 | Bang et al. |
| 5,978,715 A | | 11/1999 | Briffe et al. |
| 6,542,796 B1 | * | 4/2003 | Gibbs et al. ........... 701/3 |
| 6,633,810 B1 | | 10/2003 | Qureshi et al. |
| 6,707,475 B1 | * | 3/2004 | Snyder ................... 715/771 |
| 7,188,007 B2 | | 3/2007 | Boorman et al. |
| 7,203,577 B2 | | 4/2007 | Gunn et al. |
| 7,256,710 B2 | | 8/2007 | Mumaw et al. |
| 7,321,318 B2 | | 1/2008 | Crane et al. |
| 7,418,319 B2 | | 8/2008 | Chen et al. |
| 7,460,029 B2 | | 12/2008 | Boorman et al. |
| 7,751,947 B2 | | 7/2010 | Gunn et al. |
| 7,751,948 B2 | | 7/2010 | Boorman et al. |
| 8,365,094 B2 | * | 1/2013 | Sato et al. ............ 715/810 |
| 2008/0316058 A1 | | 12/2008 | Chen et al. |

OTHER PUBLICATIONS

FMS-4200 Operation Training, by Rockwell Collins Avionics, Apr. 8, 1997, p. 1-78.*

* cited by examiner

*Primary Examiner* — Christine Behncke
(74) *Attorney, Agent, or Firm* — The Boeing Company; Brook Assefa

(57) ABSTRACT

Methods, systems, and apparatus for tab-pane-based flight plan management interface are disclosed. The tab-pane-based flight management interface system (FMIS) is optimally Layered and Multi-Indexed (LMI) such that the management of flight management (FM) functions and associated parameters that affect the airplane's flight are easily and efficiently operable by pilots. The LMI-FMIS provides a flexible tab-pane-based architecture that allows pilots to start a flight plan modification, proceed to engage in other tasks not related to the modification, and return to the pending modification to continue the modification process. The LMI-FMIS also provides task-oriented menu structures that provide pilots tailored options or menus applicable to the task at hand thus efficiently guiding pilots to complete a task while maintaining easy access to information that was displayed prior to the commencement of the task.

18 Claims, 13 Drawing Sheets

METHODS, SYSTEMS, AND APPARATUS FOR LAYERED AND MULTI-INDEXED FLIGHT MANAGEMENT INTERFACE

TECHNICAL FIELD

Aspects of the present disclosure are directed to the optimal pilot management of aircraft navigation and control and associated apparatus, systems, and methods.

BACKGROUND

Pilots (flight crew) of modern commercial aircraft operate increasingly complex aircraft in an increasingly complex airspace environment. In executing their flying duties, pilots utilize not only their flying skills but must also manage myriad information related to their flight as efficiently as possible. Generally, the management of information related to the flight entails utilizing a number of means for acquiring, utilizing, and redirecting graphical, aural, and textual information to and from the airplane's systems. For example, such means may include a number of cockpit (flight deck) displays, control panels, keyboard devices, cursor control devices, and voice/audio systems. However, as many of these devices are used for multiple, and sometimes coupled or associated functions, aircraft engineers and pilots are respectively challenged with (1) the task of designing an optimal configuration that simplifies the pilots' task of managing all aspects of their airplane's flight and (2) the task of efficiently flying the airplane utilizing the available flight deck tools. In other words, the two-fold problem presents the challenge of design optimization that imparts sufficient flexibility to allow the pilot to optimize flight task management without undue complexity.

In this regard, flight deck displays such as Navigation Displays (ND) and Multifunction Displays (MFD) may be used with a Flight Management Computer (FMC) and the Mode Control Panel (MCP) to plan and manage an airplane's flight path and performance from takeoff to landing. Feedback as to the performance of the airplane in relation to the pilots' commands may be available in a number of locations in the cockpit, and sometimes across multiple pages, including Navigation Displays (ND), Multifunction Displays (MFD), Primary Flight Displays (PFD), Mode Control Panels (MCP), Control Display Units (CDU), and Crew Alerting Displays.

For both aircraft design engineers and pilots, the challenge of optimizing the pilots' interaction with and feedback from the airplane systems is multifaceted. Examples abound. One facet of the challenge is providing multiple methods of accessing flight management information as such information may be available in multiple display pages and formats so as to simplify the pilots' tasks. Another facet of the challenge is related to quick access of flight information, thus reducing head-down time in the cockpit. A third aspect is consistency of the flight management interface over multiple functions so as to increase pilot familiarity, increase proficiency, reduce the need for recall, and reduce the need for retraining. As display sizes and the number of available displays are limited, a fourth aspect is the display of certain information or availability thereof without, for example, obstructing, obscuring, or otherwise impeding access to other information. A fifth aspect of this challenge is commanding the airplane with simple and efficient interactions with and feedback from the airplane systems using the available crew interfaces.

Some prior attempts to address the challenge have had limited results. For example, pull-down menus and dialog boxes such as those described in U.S. Pat. No. 6,633,810, entitled "Graphical System and Method for Defining Pilot Task, Patterns and Constraints," have the drawback of covering important information on the active display requiring the pilot to remember or recall what is being obscured. Furthermore, information distributed across multiple pages can be difficult to find and review in the context of other relevant information. In addition, navigating from one page to another looking for the desired information requires knowledge or recall by pilots as to which page the information is located. Lastly, pop-up, balloon, or dialog boxes also may cover important information thus requiring further action by pilots to move the window to remove the obstruction.

Other examples such as U.S. Pat. No. 6,542,796, entitled "Methods and Apparatus for Integrating, Organizing, and Accessing Flight Planning and Other Data on Multifunction Cockpit Displays," describe flight plans that are viewable through the use of scrolling devices and the use of tabs for switching between different displays of data. However, such provision of means to manage the displayed information have the drawback of crowding out the limited display real estate, presenting to pilots options they may not need, and requiring pilots to actively look for the tabs or the data that they need to perform the task at hand.

The extent to which pilot interaction with and feedback from an airplane's systems is optimized has a direct impact on reducing pilot workload, improving pilot efficiency, improving crew awareness, reducing head-down time, reducing the risk of error and confusion, and reducing training time. In addition, such optimization also may result in improved economic performance and improved ability to make changes to the airplane's flight path and performance, thus minimizing the potential for disruption to air traffic flow on the airplane's route or the airspace through which the airplane is flying. Thus, there is a need for a method, system, and apparatus that optimizes the pilot's interaction with multiple aspects of an airplane's flight path and performance information while minimizing the obstruction, obscuration, or impediment of access to any other information.

SUMMARY

One way of meeting this need is by a Layered and Multi-Indexed (LMI) flight management (FM) interface for managing a flight such as reviewing, organizing, and modifying a flight plan, as well as managing modification states of a flight plan including cancelling pending modifications and undoing executed modifications.

The present disclosure addresses this need by a tab-pane-based flight management interface system (FMIS) that is optimally Layered and Multi-Indexed (LMI) such that the management of flight management functions and associated parameters that affect the airplane's flight are easily and efficiently operable by pilots. The LMI-FMIS provides a flexible tab-pane-based architecture that allows pilots to start a flight plan modification, proceed to engage in other tasks not related to the modification, and return to the pending modification to continue the modification process. The LMI-FMIS also provides task-oriented menu structures that provide pilots tailored options or menus applicable to the task at hand thus efficiently guiding pilots to complete a task while maintaining easy access to information that was displayed prior to the commencement of the task.

An embodiment of the disclosure comprises a flight management interface device operatively coupled to a flight management system, the device having a display depicting display elements comprising, a first layer comprising of a plurality of flight management functions, the flight management functions organized by a first tab-pane; and a second layer comprising of a plurality of modification options for the flight management functions, the modification options organized by a second tab-pane.

A task-oriented method of organizing a flight management interface system, the method activating on an interactive display a plurality of tab-panes associated with flight management tasks includes (1) displaying a first tab-pane comprising operational information associated with a plurality of flight management tasks; (2) responsive to a first event, wherein the first event is one of a pilot input or a system input, activating a second tab-pane comprising a plurality of modification options for at least one flight management task; (3) responsive to a second event, wherein the second event is one of a second pilot input or a second system input to a plurality of modification fields of at least one of the modification options, storing a pending modification for the flight management task for at least a review step or an execution step; (4) and responsive to a third event, wherein the third event is a pilot input, executing the pending modification to cause a change in at least one of a flight path or performance of an aircraft.

A system for flight management interlace comprises a computer having instructions having contents that perform a method that includes configuring a plurality of flight management functions in a first tab-pane and configuring a plurality of modification options for the flight management functions in a second tab-pane; a display operatively coupled to the computer to display the first tab-pane and the second-tab pane; and a control input device operatively coupled to the display to provide pilot input for the flight management functions and the modification options.

A computer-implemented method of managing modification states of flight management functions includes displaying in a first tab-pane comprising operational information associated with a plurality of flight management functions; responsive to a pilot input to modify at least one flight management function, activating a second tab-pane comprising of modification options for making at least one pending modification for the at least one flight management function; storing at least one pending modification in memory; updating the first tab-pane with the at least one pending modification for at least one of a review step or an execution step; and responsive to a third event, wherein the third event is a pilot input, executing the at least one pending modification to cause a change in at least one of a flight path or a performance of an aircraft.

It should be appreciated that this Summary is provided to introduce selected aspects of the disclosure in a simplified form that are further described below in the Detailed Description. This Summary is not intended to be used to limit the scope of the claimed subject matter. Other aspects and features of the present disclosure, as defined solely by the claims, will become apparent to those ordinarily skilled in the art upon review of the following non-limited detailed description of the disclosure in conjunction with the accompanying figures.

DETAILED DESCRIPTION

Figure 1:
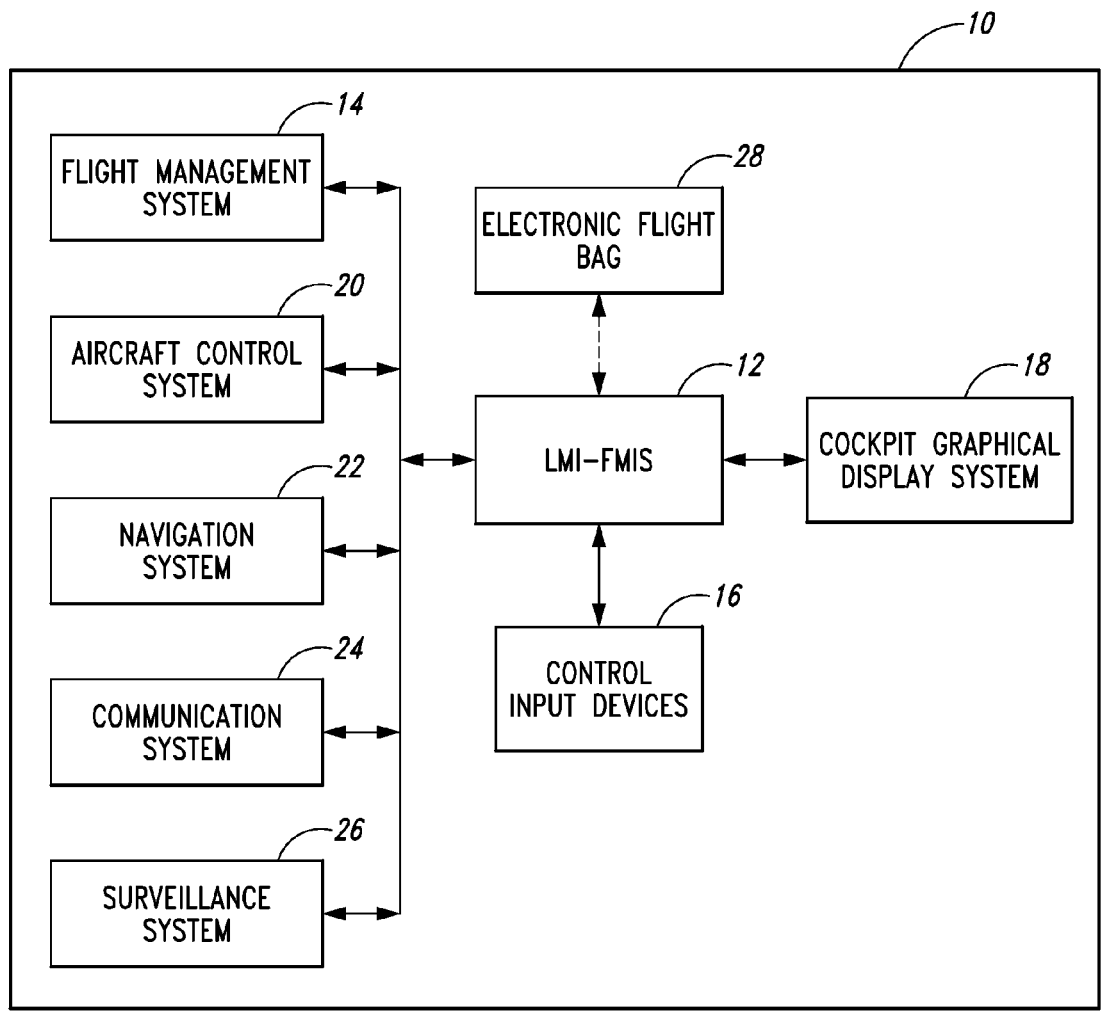
FIG. 1 is a schematic diagram of a generalized aircraft systems architecture centered on an LMI-FMIS.

The following disclosure describes methods, systems, and apparatus for a Layered and Multi-Indexed (LMI) Flight Management Interface System (FMIS). Certain specific details are set forth in the following description and the figures to provide a thorough understanding of the various embodiments of the disclosure. Well-known structures, systems, and methods often associated with aircraft control, display, and flight management systems have not been shown or described to avoid unnecessarily obscuring the description of the various embodiments of the disclosure. In addition, those of ordinary skill in the relevant art will understand that the additional embodiments of the present disclosure may be practiced without several of the details described below.

Many embodiments of the disclosure described below may take the form of computer-executable instructions, such as routines executed by a programmable computer. Those skilled in the relevant art will appreciate that the invention can be practiced on other computer system configurations as well. The disclosure can be embodied in a special-purpose computer or data processor that is specifically programmed, configured, or constructed to perform one or more of the computer-executable instructions described below. Accordingly, the term "computer" as generally used herein refers to any data processor that can be engaged in a cockpit, including computers for cockpit display systems, Flight Management Computers (FMC), Flight Control Computers (FCC), Electronic Flight Bags (EFB), laptops, tablet computers, or other hand-held devices.

The disclosure can also be practiced in distributed computing environments, in which tasks or modules are performed via remote processing devices that are linked through a communication network such as those enabled via datalink by the aircraft communication systems. In a distributed computing environment, program modules or subroutines may be located in both local and remote memory storage devices. Aspects of the disclosure described below may be stored or distributed on computer-readable media, including magnetic or optically readable computer disks (e.g., removable disks), as well as distributed electronically over networks. Data structures and transmission of data particular to aspects of the disclosure are also encompassed within the scope of the disclosure. Information handled in accordance with aspects of the disclosure can be presented on displays or display media, for example, CRT screens, LCD screens, head-up displays, or other suitable devices.

Pilots (flight crew) of modern commercial aircraft operate increasingly complex aircraft in increasingly complex airspace environment. In executing their flying duties, pilots utilize not only their flying skills but must also manage myriad information related to their flight as efficiently as possible. In this regard, pilots are presented with a number of complex cockpit systems accessible through a limited number of crew interface devices implementing means for acquiring, utilizing, modifying and redirecting graphical, aural, and textual information to and from the airplane's systems. Such means may include a number of cockpit (flight deck) displays, control panels, keyboard devices, cursor control devices, and voice/audio systems. However, as many of these devices are used for multiple, and sometimes coupled or associated functions, aircraft engineers and pilots are respectively challenged with (1) the task of designing an optimal configuration that simplifies the pilots' task of managing all aspects of their airplane's flight and (2) the task of efficiently flying the airplane utilizing the available flight deck tools. In other words, the two-fold problem presents the challenge of design optimization that imparts sufficient flexibility to allow the pilot to optimize flight task management without undue complexity.

Figure 4:
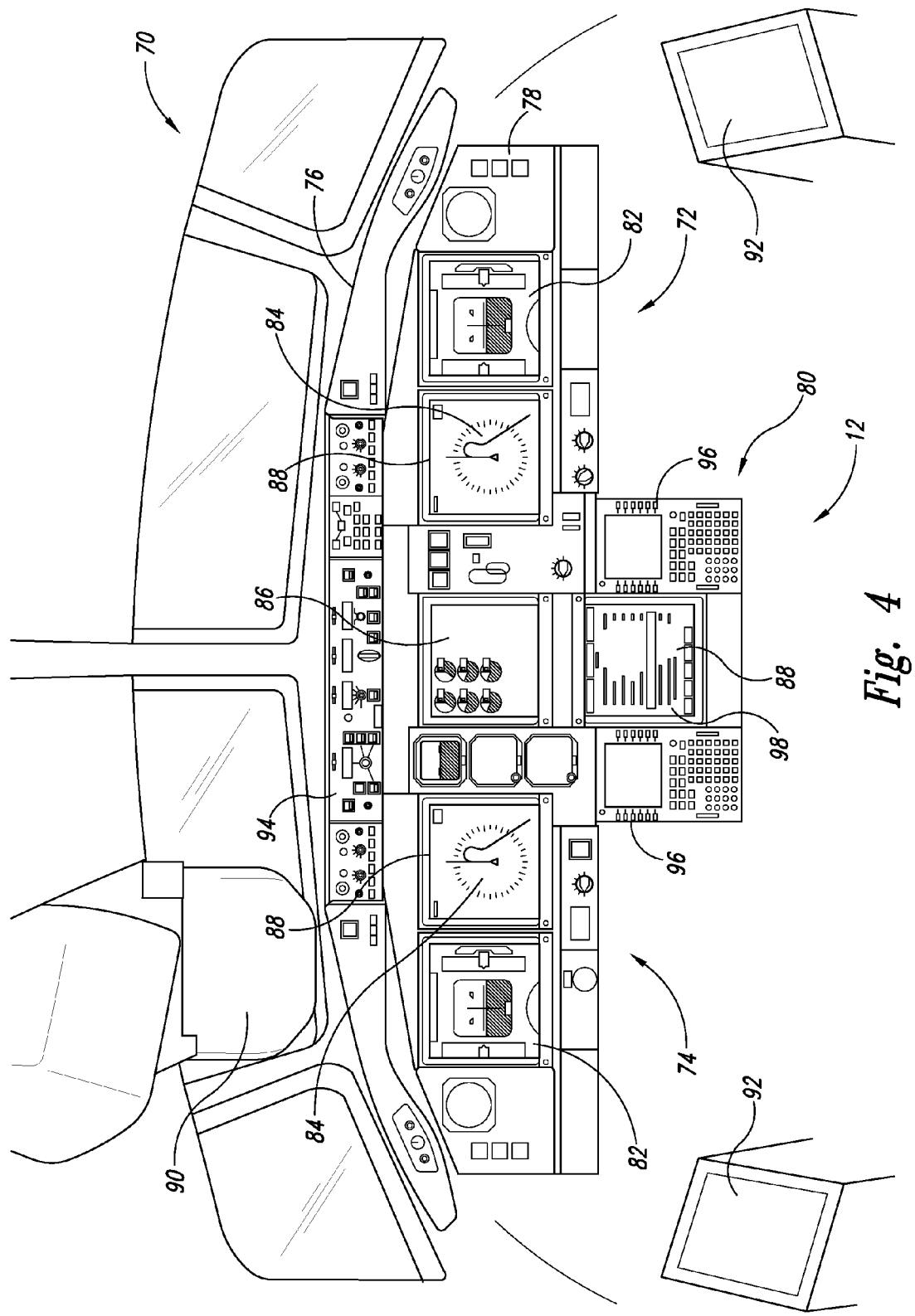
FIG. 4 is a diagram illustrating a more detailed arrangement of cockpit instruments that enable an advantageous embodiment according to the disclosure.

For example, pilots generally utilize the Flight Management System (FMS) 14 shown in FIG. 1, which typically may entail a Flight Management Computer (FMC) (not shown) and a Control Display Unit (CDU) 96, shown in FIG. 4, for managing the (a) flight planning, (b) navigation, (c) performance, (d) guidance, and (e) datalink communication aspects of their flight. This entails, among others, planning, entering, and activating aspects of their flight for each phase of flight including taxi, take-off, climb, cruise, descent, approach, and landing.

With respect to flight guidance, pilots may utilize both the FMS 14 and the Mode Control Panel (MCP) 94, shown in FIG. 4, to manage aspects such as the lateral path, the vertical profile, and the speed profile of the aircraft's flight. Input for managing these aspects may be made, for example among others, via the CDU 96, the MCP 94, or other interactive means such as touch-screen or cursor-control devices. The flight guidance input may be used to control the autopilot and related systems such as flight director systems, flight control computers, and autothrottle system that may in turn send commands to other airplane systems such as the engines and flight control systems to direct and control the airplane consistent with the pilots' commands.

Lastly, information pertinent to the aforementioned aspects (a)-(e) above may be displayed in a number of display locations on the aircraft such as the Primary Flight Displays (PFD) 82, Navigation Displays (ND) 84, Mode Control Panels (MCP) 94, Control Display Units (CDU) 96, and Crew Alerting Displays 86 as shown in FIG. 4. This information may include, for example but not limited to, pilot-entered data, uplinked data, stored data from navigation databases (NDB) or Aerodynamic and Engine databases (AEDB), and actual data as processed or calculated for the current flight.

Thus pilots have to keep track of myriad information, information often originating from multiple sources and control authorities that are displayed at multiple displays, and sometimes, multiple display pages or windows associated with these displays. Furthermore, they must filter or recall the information for what may affect the current and/or planned phases of flight, make decisions and modifications based on their decisions, and manage the airplane's flight path and performance consistent with the required or desired flight path and performance for the flight.

For both aircraft design engineers and pilots, the challenge of optimizing the pilots' interaction with and feedback from the airplane systems is multifaceted. Examples abound. One facet of the challenge is providing multiple methods of accessing flight management information available on multiple display pages and formats so as to simplify the pilots' tasks. Another facet of the challenge is related to quick access of flight information, thus reducing head-down time in the cockpit. A third aspect is consistency of the flight management interface over multiple functions so as to increase pilot familiarity, decrease errors, increase proficiency, reduce the need for recall, and reduce the need for retraining. As display sizes and the number of available displays are limited, a fourth aspect is the display of certain information or availability thereof without, for example, obstructing, obscuring, or otherwise impeding access to other information. A fifth aspect of this challenge is commanding the airplane with simple and efficient interactions with and feedback from the airplane systems using the available crew interfaces.

Prior attempts to address this challenge have had limited results. For example, pull-down menus and dialog boxes (also known as drop-down menus and dialog windows respectively) have the drawback of covering important information to the current task on the active display requiring the pilot to remember or recall what is being obscured. Pop-up, balloon, or dialog boxes may not only cover important information upon activation but also continue to cover such information until the interaction is complete, thus requiring further action by pilots to move the dialog box to view the covered information. With limited display sizes, the sharing of displays for multiple applications, as well as the limited number of displays in the flight deck, this kind of display management interaction may unnecessarily distract the pilots from higher priority responsibilities.

Another problem with pull-down menus, dialog boxes, or static tabs as described in the BACKGROUND section of this disclosure is that they offer a slate of options for all of the displayed information as the system does not know what the pilot will select on the display. Thus, such over-inclusive provision of means to manage the displayed information have the drawback of crowding out the limited display space, presenting to pilots options they may not need, and requiring pilots to actively look for the tabs or the data that they need to perform the task at hand.

Furthermore, while such windows, boxes, menus, and tabs may unnecessarily offer a slate of options for all of the displayed information, what they offer for the pilot's particular task at hand may be an abbreviated list of commands or actions, thus forcing the pilot to "drill-down" through the menu or window structure to a different menu, a different window or a different display page to implement an action. Information distributed across different windows or pages can be difficult to find and review in the context of other relevant information. In addition, navigating from one page to another looking for the desired information requires knowledge or recall by pilots as to which page the information is located. Thus, with a complex and often long list of information such as a flight plan, dialog boxes and menus may introduce additional difficulties that distract the pilot away from the important task of managing the flight to a trivial task of navigating a menu structure.

In addition to the problems discussed above, the aforementioned attempts utilizing drop-down menus, pop-up, balloon, or dialog boxes also introduce a significant limitation of (1) locking-down the pilot onto a particular task and (2) locking out the pilot from other tasks. Such implementations are generally configured to offer a list of commands, accept a pilot command, implement the command, and close upon implementation of the command. Pilots don't have the option of starting the modification process, move to a different task, and go back to the modification process to start where they left off. Thus, implementations using such menus and windows unnecessarily lock the pilots' sequence of tasks until interaction with such menus and windows is complete.

The consequential effect of (1) locking-down the pilot onto a particular task and (2) locking out the pilot from other tasks is two-fold. First, the pilot may be unable to view information that is needed to complete the task started in the pop-up or dialog box and may have to write down or to recall from memory the information needed to complete the task, thereby increasing workload and potentially introducing error. Second, the pilot may be unable respond to matters that require urgent attention without abandoning the task (i.e., closing the window or box) and being forced to restart the task from the beginning after the urgent matter has been resolved, thereby adding unnecessary rework and workload.

Thus, there is a need for methods, systems, and apparatus that optimize the pilot's interaction with multiple aspects of an airplane's flight path and performance information while addressing the problems discussed above. The extent to which pilot interactions with and feedback from an airplane's systems are optimized has a direct impact on reducing pilot workload, improving pilot efficiency, improving crew awareness, reducing head-down time, reducing the risk of error and confusion, and reducing training time. In addition, such optimization also may result in improved economic performance, as well as improved ability to make changes to the airplane's flight path and performance, thus minimizing the potential for disruption to air traffic flow on the airplane's route or the airspace through which the airplane is flying.

Figure 5:
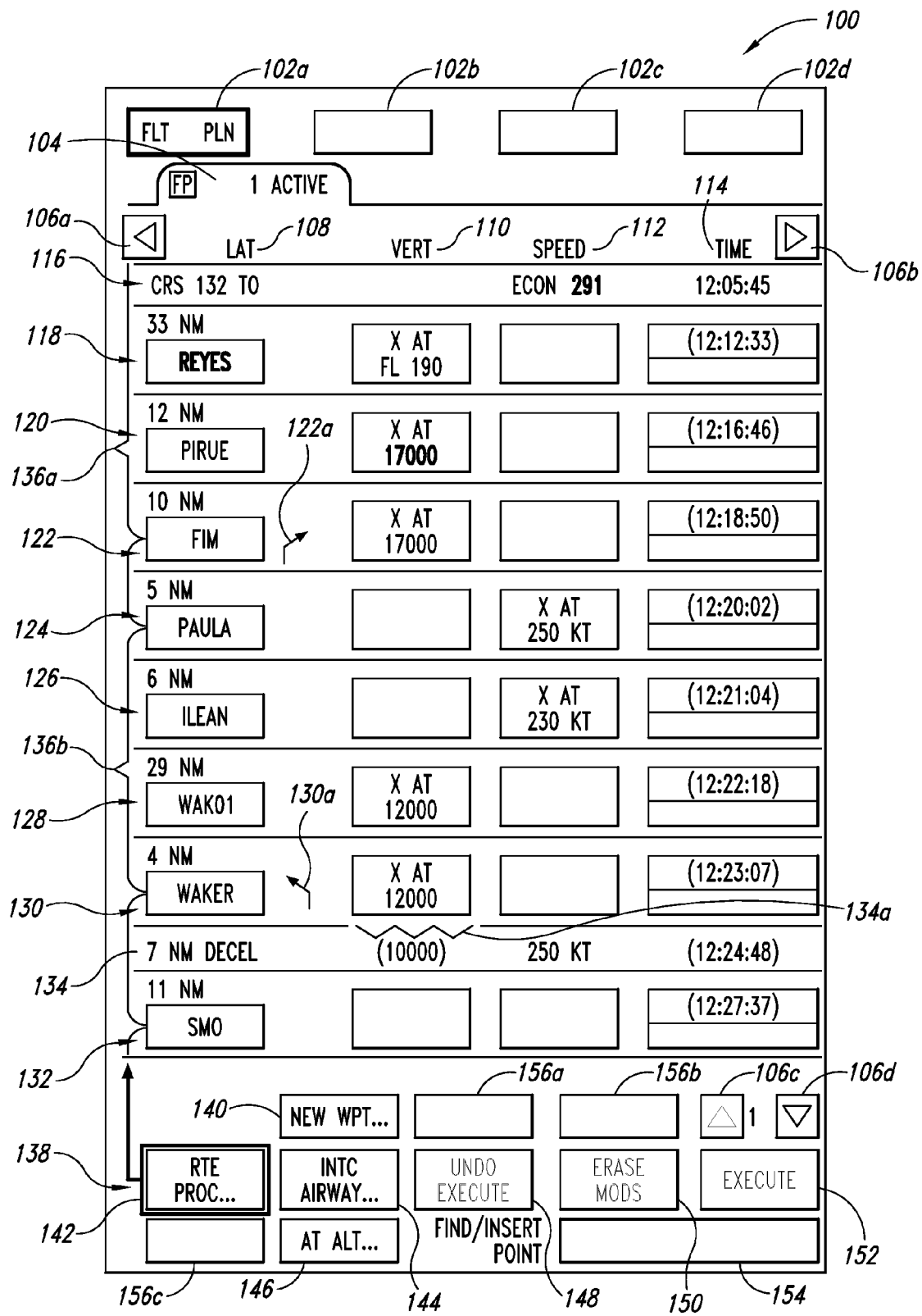
FIG. 5 is a diagram illustrating a general layout of the LMI flight management interface showing an active flight plan in an operational tab-pane.
Figure 6:
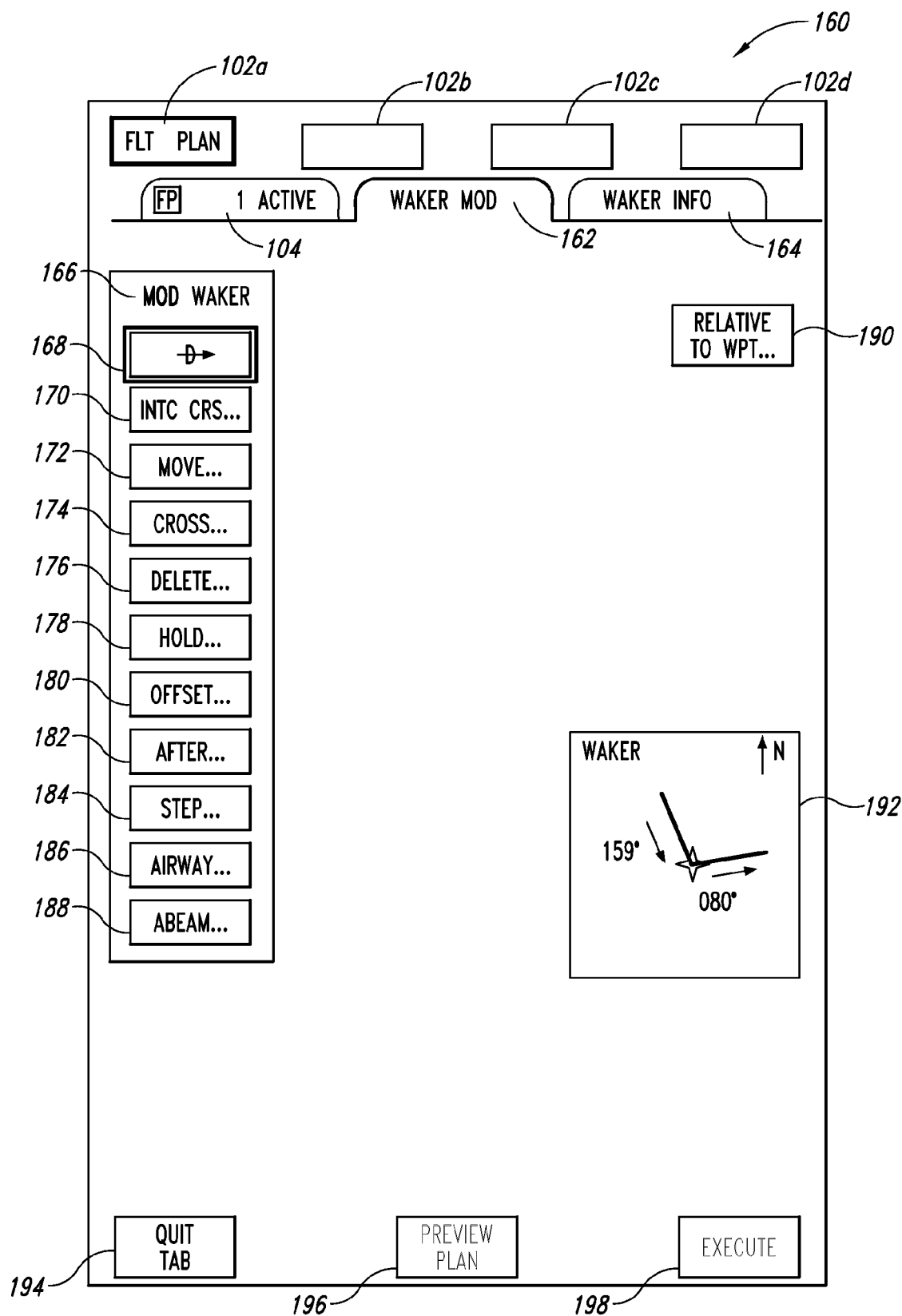
FIG. 6 is a diagram showing a flight plan modification tab-pane.
Figure 7:
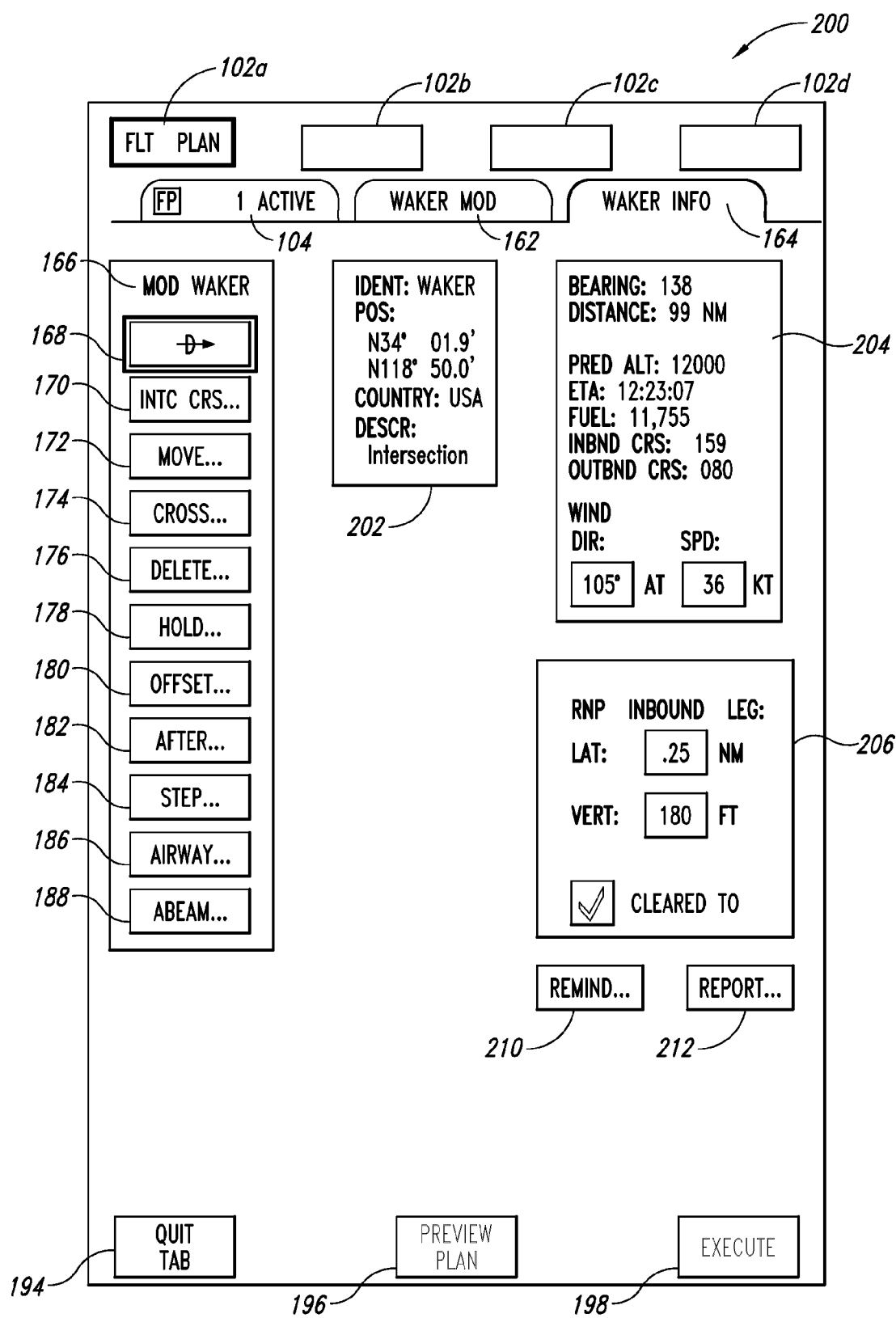
FIG. 7 is a diagram showing an information tab-pane for a modification.

The present disclosure addresses this need by a tab-pane-based flight management interface system (FMIS) that is optimally Layered and Multi-Indexed (LMI) such that the management of flight management (FM) functions and associated parameters that affect the airplane's flight are easily and efficiently operable by pilots. The tab-pane-based LMI-FMIS has a number of features designed to manage FM functions. The LMI-FMIS has three layers, an example of which is shown in FIGS. 5-7: (1) a first layer identified as a operational layer depicted by a first tab-pane (FIG. 5), which may be described as the operational tab-pane; (2) a second layer identified as a management or modification layer depicted by a second tab-pane (FIG. 6), which may be described as the modification tab-pane; and (3) a third layer identified as an information layer depicted by a third tab-pane (FIG. 7), which may be described as the information tab-pane.

First, the LMI-FMIS displays first information without a complex menu structure in a first layer as presented by a first tab-pane. The first layer is identified as the operational layer, generally depicting the current or future operational state of the aircraft such as flight progress, system states, and the like via FM functions that are operator-activatable. The term operator-activatable display element refers to display elements that are selectable and/or modifiable via a control input device 16 by, for example, aligning a cursor with the operator-activatable element and entering a keystroke, mouse click, or other appropriate signal. Those skilled in the art would understand how operator-activatable elements function; a more detailed description may also be found in U.S. Pat. No. 7,418, 319, entitled "Systems and Methods for Handling the Display and Receipt of Aircraft Control Information".

The term "flight management function" (or FM function) in the context of LMI-FMIS includes any operator-activatable display element of the operational tab-pane that the pilot may select to activate a modification tab-pane and make a change to that FM function by changing a value associated with the selected FM function. A flight management function may be represented on a tab-pane as an operator-activatable graphical symbol, icon, button, or an alphanumeric text string signifying an aspect of function, for example and without limitation, related to a flight plan, route procedures, speed schedules or associated indices, parameters, or values. Also associated with flight management functions are flight management tasks. Flight management tasks are tasks that pilots may need to perform in managing their flight such as but not limited to making progress reports, managing datalink communications, or preparing/programming for upcoming cockpit tasks. A flight management task may entail working with one or more flight management functions.

First information displayed in the first layer may be operational information such as those related to flight management functions, real-time flight operating parameters, a flight plan list, a list of crew tasks, an instance of the lateral navigation display (ND), an instance of the vertical situation display (VSD) and the like, which may be utilized in managing the (a) flight planning, (b) navigation, (c) performance, (d) guidance, and (e) datalink communications aspects of the flight. The first layer generally is represented by a single tab-pane where the content of the tab pane may be different depending on the task at hand. Thus, for example and without limitation, first information such as a flight plan in the first layer may be presented in a table format (tabular representation) or in a graphical format. Lastly, in some other distinct embodiments, the first layer may also be depicted by two or more tab-panes, for example, a graphical tab-pane and a tabular tab-pane, so as to provide airline customers options to configure preferences.

Second, the menu structure applicable to a pilot's selection in the first layer of the first tab-pane is displayed in a second layer depicted by a second tab-pane. The second layer is generally identified as the modification layer. The second layer presents the pilot a menu of modification means or functions to update the information in the operational layer while allowing the pilot to switch to the first tab-pane to view the first information. In addition to modification means, the second layer may present the pilot second information such as information that may be utilized by said modification means. Thus, for example and without limitation, if the pilot selects first information related to an FM function (e.g. an arrival procedure) in a first (operational) tab-pane, a second (modification) tab-pane of the second layer may present modification means to the arrival procedure as well as a list of potential arrival procedures for selection by the pilot. Executed (commanded) modifications or pending modifications made in the modification tab-pane update the first information displayed in the active tab-pane, where pending modifications can be presented in a manner different than executed modifications.

Third, information related to that displayed in the first tab-pane and/or the second tab-pane may be depicted in a third tab-pane. The third layer is generally identified as the information layer. The information layer may present third information such as additional descriptive data, predictive data, or planning data that further explain information on the first and/or second tab-panes. Thus, for example, a pending modification of an arrival runway in the second tab-pane may have further information about that arrival runway such as runway length, runway elevation, runway width, etc., presented in the third (information) tab-pane. An example of predictive data is data such as predicted altitude, predicted speed, or ETA at a certain waypoint. Lastly, an example of planning data is data such as inbound course and outbound course at a certain waypoint.

The tab-pane based LMI interface such as that shown in FIGS. 5-7 has several features that make it suitable for pilot interaction. First, such interface allows pilots to start a flight plan modification and navigate to other tab panes to address other tasks without completing the modification; that is, the tab-pane LMI interface allows pilots to engage in a temporary modification activity without being locked into a task sequence—and thereby locked out of other activity—by the interface structure.

Second, the tab-pane LMI interface admits a longer list of commands that are available on the modification tab-pane such as FIG. 6 that would not be easily or completely available on a drop-down menu, a pop-up, or a dialog window. For example, FIG. 6 shows a long list of commands such as INTC CRS, MOVE, ABEAM, etc., with room for more that can be applied to waypoint WAKER. Because a tab-pane LMI interface can easily utilize an entire page, it is much more scalable and user-friendly for a flight management interface than the aforementioned options.

Third, the tab-pane LMI interface allows a pilot to switch back and forth between a modification tab-pane and a flight plan tab-pane or other tab-pane without cancelling and restarting the task or moving a drop down menu or dialog box, thus improving efficiency of the pilot interaction.

Fourth, and more importantly, the tab-pane LMI interface implements an organizing principle that allows a pilot to not only perform a discrete task, but also leads the pilot through a task process. Whereas with the aforementioned interfaces, a pilot has to call up the correct menu or an over-inclusive menu or window to start a task, with the tab-pane LMI, a pilot need only make a series of selections that lead to a full set of commands available for the pilot's selections and only for the pilot's selection. Thus, from a flight plan list such as the one displayed in FIG. 5, a pilot may view the list, select a waypoint to effect a change to the flight plan in relation to the waypoint, and open up a modification tab-pane with a full complement of commands available for that waypoint to implement the command immediately or at a later point in time.

Figure 9:
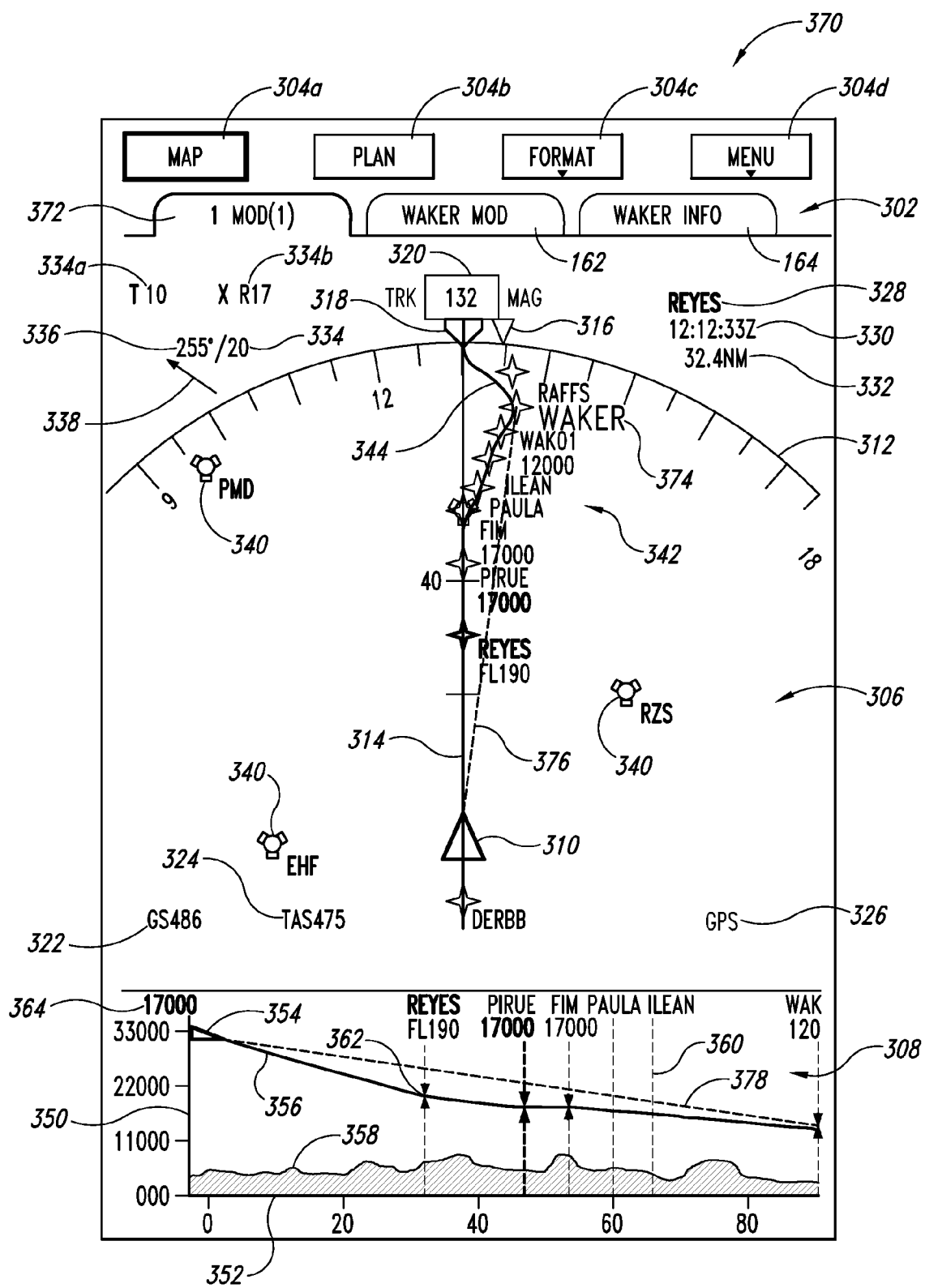
FIG. 9 is a diagram illustrating a modification in progress related to a waypoint.

By the way of an introductory example and not limitation, one salient aspect of the present disclosure may be shown by a short discussion of one parameter of a flight plan such as speed. As shown in FIG. 5 and FIG. 9 a flight plan with interactive capability may be (1) expressed in tabular form as a list of waypoints and parameters such as crossing restrictions and speeds associated with the waypoints, or (2) expressed in graphical form as in lateral and vertical navigation display formats. For each waypoint such as REYES, there may be an associated altitude restriction which is expressed in column 2 of FIG. 5 as "X at FL190" (read cross REYES at 19,000 ft) and also in graphical and textual format as REYES FL190 in FIG. 9. Furthermore, for each waypoint such as PAULA and ILEAN, there may be associated speed restrictions of 250 knots and 230 knots respectively.

For pilots, rather than displaying both the tabular and graphical forms simultaneously on one, and often relatively small, cockpit display, it may be easier and less strenuous to use the entire display for either the tabular or graphical form with simple navigation to switch from one to the other where the navigation means are optimally configured to enable access to a parameter in question such as speed. Thus, a pilot may, for example, navigate from the tabular (FIG. 5) or graphical (FIG. 9) tab-panes to access a speed modification page of one waypoint to set the speed for that particular waypoint. Alternatively, a pilot may navigate to access the entire speed schedule of the flight plan to set the speed schedule for multiple waypoints as described in U.S. application Ser. No. 12/621,298 entitled, "Methods and Systems for Management of Airplane Speed Profile", which is incorporated herein in its entirety by reference.

For example, to modify the speed restriction for waypoint PAULA only, a pilot may select PAULA in row 124 to display a page to modify the speed restriction for PAULA currently at 250 KT. But if a pilot wants to modify the speeds for PAULA and ILEAN, a pilot may select SPEED 112 as shown in FIG. 5 and display a Speed Profile Management System tab-pane not only to modify the setting for PAULA but to view the entire descent speed profile, and potentially modify speeds for ILEAN as well. For such embodiments where SPEED 112 activates a modification tab-pane, SPEED 112 may be optionally coded as a selectable icon or depicted by different color or font. Reverting back to the active flight plan is then accomplished by selecting the ACTIVE tab of FIG. 5 or FIG. 9.

Among the reasons why such an LMI-FMIS configuration contributes to improved pilot efficiency include (1) its ability to offer a more complete set of options in an intuitive interface for making modifications via multiple optional means (multi-index); (2) its structure as simple layered (i.e., operational, modification, and information layers) architecture depicted in tab-pane-based format that maximizes the space available for providing functions, modification options, and information; (3) its flexibility to continue to allow access to other layers and their tab-panes while the pilot is engaged in a modification process thus improving efficiency while reducing workload and the potential for error; (4) its adaptability to other FM functions as discussed with the speed example above; (5) its scalability that easily admits incorporation of new FM functions, airspace rules, or other considerations that the pilots must manage through the LMI-FMIS thus increasing familiarity and reducing training needs; and (6) the ability to filter the displayed modification menu contextually so as to make available only the needed modification options for the pilot's selection, and thus, intuitively lead the pilot through the task process in managing the aircraft's flight path, performance, or other related aspects of its flight.

Turning now to a more detailed discussion of the disclosure and the figures, FIG. 1 depicts an embodiment of a generalized aircraft systems architecture 10 centered on an LMI Flight Management Interface System (LMI-FMIS) 12. FIG. 1 has been simplified in order to make it easier to understand the present disclosure. Those skilled in the art will appreciate that FIG. 1 is one configuration of many that can be implemented for an embodiment of an LMI-FMIS 12. For example, and without limitation, the LMI-FMIS 12 can be hosted on a number of on-board computers or devices suitable for the airplane configuration at hand such as a dedicated LMI-FMIS computer (not shown) that is not part of the Flight Management System (FMS) 14 or its components, a Flight Management System (FMS) 14, or a cockpit graphical display system (CGDS) 18, which typically comprises at least a graphics display computer (not shown) and a graphics display (not shown). With respect to displays, in various embodiments as shown in FIG. 4, an aircraft cockpit 100 and the airplane's cockpit graphical display system 18 may include at least one of a Primary Fight Display (PFD) 82, a Navigation Display (ND) 84, a Head-Up Display (HUD) 90, a Multi-Function Display (MFD) 88, a Crew Alerting Display 86, and an Electronic Flight Bag (EFB) display 92, or other displays in the cockpit, a number of which may be configured to host the LMI-FMIS 12.

Referring to FIG. 1, an LMI-FMIS 12 is provided to manage the flight management functions of an airplane. The LMI-FMIS 12 may be coupled or connected to the interfacing systems of FIG. 1. In some embodiments, the term "coupled" may be used to indicate that two or more components are in either direct or indirect (i.e., with an intervening component between them) physical, electrical, or communicative (e.g., wireless connection) contact with each other or that two or more elements co-operate or interact with each other. Similarly, the term "connected" may be used to indicate that two or more components are in direct physical, electrical, or communicative contact with each other.

From the available information in the cockpit affecting all aspects of the flight plan of the airplane, the LMI-FMIS 12 extracts the information from the interfacing systems described in FIG. 1 and makes it available to the flight crew on the LMI-FMIS 12 display displayed on a Cockpit Graphical Display System (CGDS) 18. The LMI-FMIS 12 also transmits information that has been modified, changed or updated by the flight crew using the LMI-FMIS' 12 interactive capability, and potentially other Control Input Devices 16 affecting flight plan back to the systems shown in FIG. 1 to affect flight operating parameters of the airplane such as speed, thrust, altitude, performance or other aspects related lateral and vertical navigation.

In this regard, the Aircraft Control System 20 (components of the aircraft flight control system not shown) provides real-time flight operating parameter-related information from flight control computers, autopilot and autothrust systems, and selected flight control inputs on the Mode Control Panel (MCP) 94 (shown in FIG. 4). It also receives flight operating parameter commands or settings from the LMI-FMIS 12, the MCP 94, or other systems and directs them to its component systems, such as for example, the autothrottle and engines, to affect the flight of the airplane in real-time or at a later point in the flight.

Figure 2:
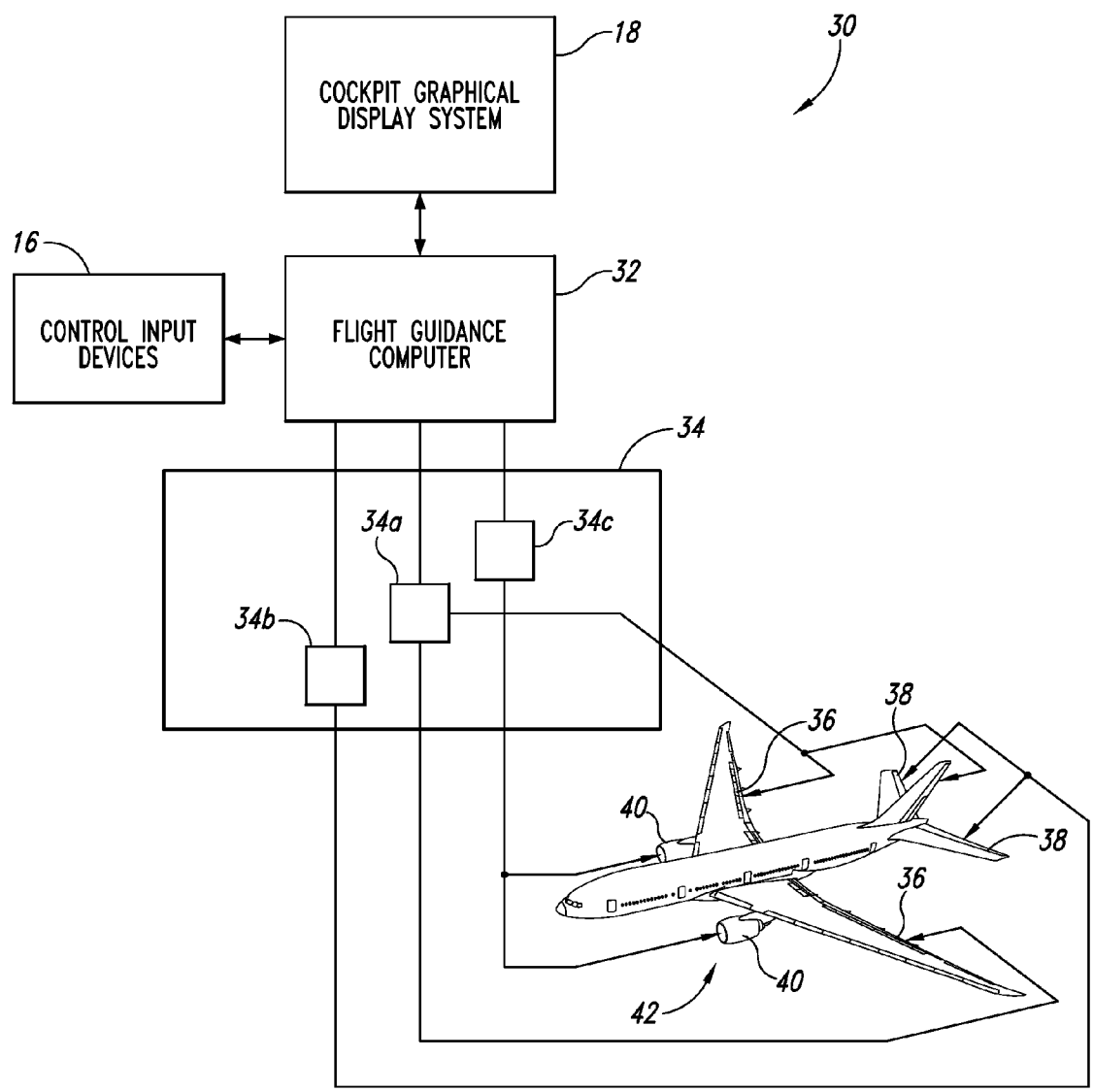
FIG. 2 is an example of an aircraft control architecture that is managed by the LMI flight management interface.

Aspects of the flight control system have been described in further detail previously, an example of which may be found in U.S. Pat. No. 7,460,029, entitled "Systems and Methods for Presenting and Obtaining Flight Control Information". For example, as shown in FIG. 2, a flight guidance system 30 that is an embodiment of Aircraft Control System 20 connected to an LMI-FMIS 12, may entail display devices such as a Cockpit Graphical Display System 18 or other annunciators (not shown), Control Input Devices 16, a flight guidance computer 32, linked to one or more control systems 34, shown as a lateral/directional motion or roll/yaw control system 34a, a vertical motion or pitch control system 34b, and an airspeed (or autothrottle/engine) control system 34c. The lateral/directional control system 34a can be coupled to flight control surfaces affecting lateral and directional control 36, which are typically ailerons and/or rudders of the airplane 42. The vertical motion control system 34b can be coupled to pitch control surfaces 38, which are typically the aircraft's elevators. Lastly, the airspeed controller 34c can be coupled to the engines 40 of the airplane 42 in some path-based modes of operation, and can be coupled to the elevators in some climb and descent modes of operation. Pilots, for example, may interact with the Aircraft Control System 20 via the LMI-FMIS 12 by modifying and executing FM functions displayed on the interface such as by changing speed to affect the speed profile of the airplane; changing altitude to affect the vertical flight profile; or changing waypoints to change the lateral flight path of their airplane in real-time or program the change to execute at a later point in time.

Returning to FIG. 1, the Flight Management System (FMS) 14, and its Navigation database (NDB) (not shown) and Aerodynamic and Engine (performance) database (AEDB) (not shown) provide information necessary for navigation along the four-dimensional (4D, including time) flight route for calculating the optimal or desired performance for that flight route. The FMS 14 and its lateral and vertical navigation guidance functions may also utilize information from Navigation System 22, Communication System 24, and Aircraft Flight Control System 20 and display flight management information on a Cockpit Graphical Display System (CGDS) 18.

The Communications System 24 may also be enabled to uplink and downlink information, for example and without limitation, related to flight plans, Air Traffic Control (ATC) instructions for lateral navigation, vertical navigation, speed changes, required time of arrival at a waypoint, required time of arrival at a destination, weather, or Airline Operational Control (AOC) messages such as those related to gate information and updated time of arrival. It may also be engaged in transmitting and receiving coordination messages between aircraft that are engaged in a collaborative Air Traffic Management (ATM) application such as where one aircraft is asked to follow another aircraft at a certain distance, time, speed and/or altitude parameters.

Another important system in managing FM functions is the airplane's Navigation System 22. Its component systems such as the Global Positioning System (GPS), Distance Measuring Equipment (DME), VHF Omni-Directional Range (VOR), Air Data and Inertial Reference Unit (ADIRU), Air Traffic Control (ATC) Transponders, Traffic Alert and Collision Avoidance System (TCAS) and/or other traffic computers used for Air Traffic Management (ATM) applications provide FM function-related information as related to, for example and without limitation, the navigation or guidance performance of the aircraft in reference to its flight plan, a navigation station or waypoint, or to some objective as set forth by a procedure such as a Continuous Descent Approach (CDA) or a collaborative Air Traffic Management (ATM) application. In this regard, certain ATM applications may be available as part of the Surveillance System 26. Alternative configurations may also embody ATM applications and certain navigation information in a suitably equipped Electronic Flight Bag (EFB) 28 that may interface with the LMI-FMIS 12.

In addition, Control Input Devices 16 are provided to enter, accept, and utilize FM function-related information that is available from, without limitation, a communications uplink from Air Traffic Control (ATC) or an Airline Operational Center (AOC) through the Communication System 24, a paper chart, customized airline-specific approach procedure database, or other on-board aircraft systems such as the Aircraft Control System 20, the Flight Management System 14, the Navigation System 22, or the Surveillance System 26. The Control Input Devices 16 may also be utilized to manage the information displayed on the LMI-FMIS 12 in a manner generally similar to that described in U.S. Pat. No. 7,418,319, entitled "Systems and Methods for Handling the Display and Receipt of Aircraft Control Information" and incorporated herein in its entirety by reference. The Control Input devices 16 may also be used to command the LMI-FMIS 12 to pop-up LMI-FMIS graphical information as a function of when the aircraft is about to change its speed, change direction at a waypoint, or start a descent at a top of descent point. It may also be used to add or remove certain data tags associated with the graphical elements displayed on the LMI-FMIS 12 so that pilots may be able to customize their flight plan management display.

Lastly, the Control Input Devices 16 may be embodied as a dedicated control panel or as part of another control input device on the airplane. For example, and without limitation, the device 16 may be integrated as part of the Control Display Unit (CDU) 96, or as part of another control panel for controlling flight management, navigation or display aspects of the aircraft's systems. Further, the devices 16 may include, without limitation, voice command input means, keyboards, cursor control devices, touch-screen input and line select keys (LSK) or other keys on a CDU 96.

The above detailed description of FIGS. 1 and 2 are intended to describe one embodiment but not the only embodiment of this disclosure, and in no way limit the scope of the disclosure. While the components of the systems such as those depicted in FIG. 1 can be designed to interact with each other in a variety of ways, they must in the end be helpful to the pilot in managing the flight of the airplane. The LMI-FMIS 12 is configured to optimally bring together the FM function-related aspects of the aforementioned systems in the cockpit as described below.

Figure 3:
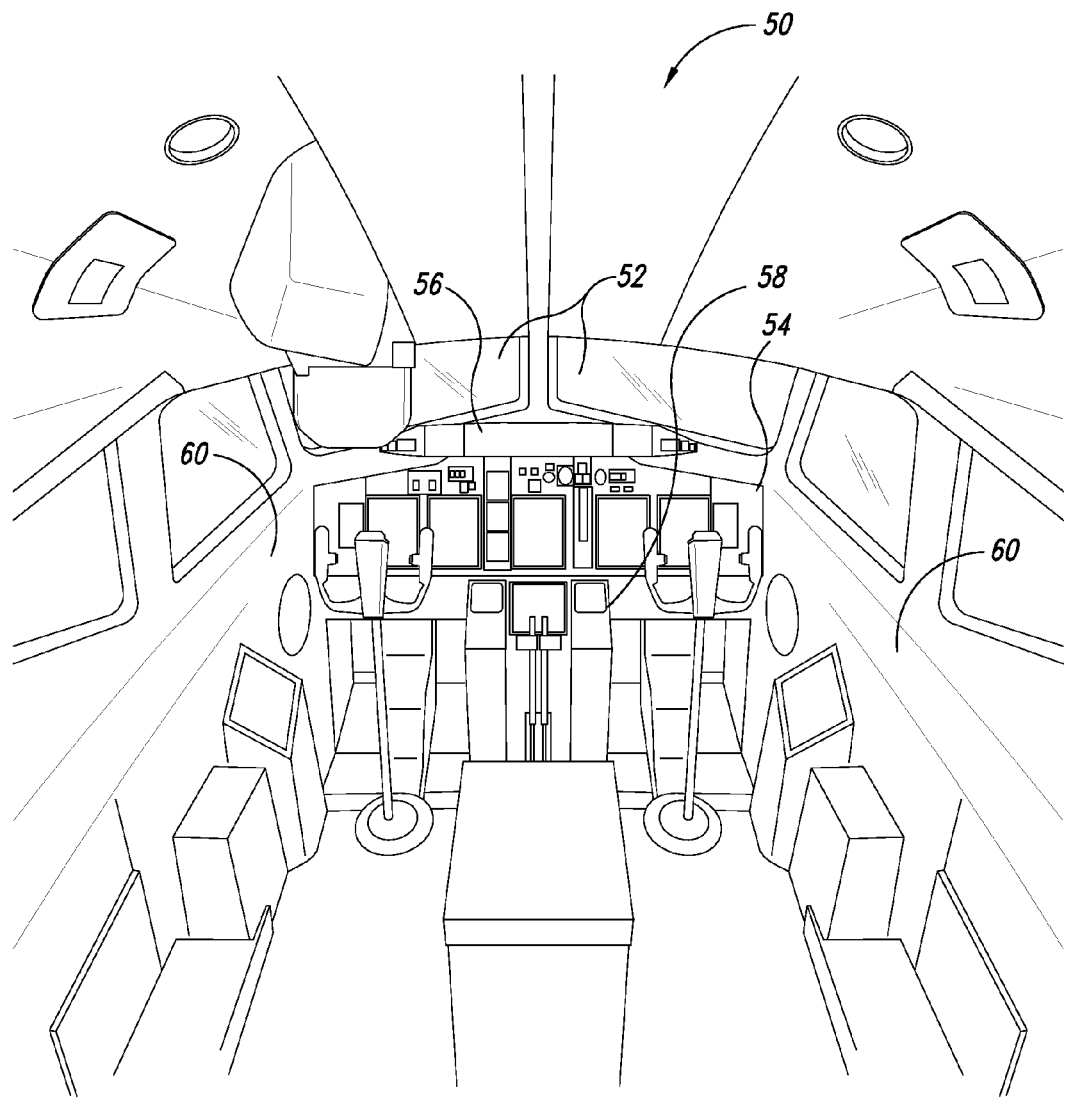
FIG. 3 is a diagram illustrating a general arrangement of an aircraft cockpit.

FIG. 3 illustrates a general arrangement of an aircraft cockpit 50 showing a layout of many of the aircraft systems that interact with, or potentially host, the LMI-FMIS 12, which are shown in further detail in FIG. 4. The cockpit 50 includes forward windows 52 a plurality of flight instruments on the forward instrument panel 54, a glare shield 56, a control pedestal 58, and sidewalls 60.

FIG. 4 shows a close-up view of the cockpit 70 with a glare shield 76, a forward instrument panel 78, and a control pedestal 80 with various instruments 72 and displays 74. The forward instrument panel 78 and the control pedestal 80 have a number of displays, including multifunction displays 88. As shown here, the multifunction displays 88 include a Navigation Display 84 and a Checklist Display 98. The multifunction display 88 on the control pedestal 80 may also be configured to manage datalink communications or other cockpit functions. In addition, the cockpit has a Head-up Display 90 (an optional, second Head-up display is not shown), a Control Display Unit (CDU) 96, and an Electronic Flight Bag display 92. All of the aforementioned systems, which in display-oriented functional aspects may be part of the Cockpit Graphical Display System 18, can potentially be used in displaying or hosting some or all aspects of LMI-FMIS 12.

Lastly, a Mode Control Panel (MCP) 94 is positioned on the glare shield 76. The MCP 94 along with the CDU 96 and multifunction displays 88 with interactive capability may be capable of controlling or modifying inputs that influence the flight plan of the airplane.

FIG. 5, drawn not to scale for illustrative purposes, depicts by the way of an example and not limitation, an embodiment of an interactive tab-pane-based LMI-FMIS display 100, a flight plan tab-pane. The display allows for quick, efficient, graphically integrated, and simplified flight plan management by the flight crew. The display may be shown on any Cockpit Graphical Display System 18 display devices and CDUs 96 with interactive capability. The display may also be shown on wired or wireless display devices in the cockpit operatively connected to receive, and optionally transmit, data to and from the systems shown in FIG. 1. Furthermore, one of the advantages of the LMI-FMIS' depiction of a simplified flight plan is that it can be shown on a portion of a display device, a single display device, or on multiple display devices. For example, a non-flying pilot may show the flight plan tab-pane as in FIG. 5 on a nearby display while the flying pilot may view the impact of the pending modifications by the non-flying pilot on a related tab-pane such as one depicting the navigation display (ND).

It should be appreciated that one or more of the display elements described below are operator-activatable (i.e., pilot-activatable). A signal input by the pilot via Control Input Device 16 to activate the operator-activatable display element may, for example, include aligning a cursor or other control element with the operator-activatable element and entering a keystroke, mouse click, or other appropriate signal applicable to the airplane configuration to change or update the displayed information. Optionally, operator-activatable display elements may include emulations of buttons or mechanical switches which appear on the display. Lastly, operator-activatable display elements may be configured and displayed in a manner different from non-activatable display elements.

Here, it may be helpful to break down the number of display elements by category. The display elements described below may be further coded by color, shape, dynamic characteristics, or other visual attributes and potentially, accompanied by aural tones or annunciations depending on the critical nature of the information. Furthermore, the data presented in the figures, which may be slightly modified versions of available data on other displays or data not previously provided at all, are provided by the way of example only and should not be construed as limiting. Lastly, any combination or sub-combination of graphical elements provided in this disclosure may be available for display; the combinations provided in figures are provided by the way of example and not limitation.

As the LMI-FMIS display 100 may be hosted on a number of display devices, and potentially as part of a series of flight management pages or functions, the LMI-FMIS page is identified by a header or page titled, FLT PLN 102*a* signifying the flight plan portion of the interface. Other headers or selectors (not shown) may be added in the blank designators 102*b*, 102*c*, 102*d* for various aspects related to the LMI-FMIS. For example and without limitation, a "systems", "route generation" or other headers may be added depending on the LMI-FMIS' configuration. Other displays such as help menus or customizable configurations for different airline customers may also be programmed to be accessed via 102*b*, 102*c*, or 102*d*. The capability to customize or tailor the configuration may be available to (1) aircraft engineers during the design and manufacture of the airplane, or to (2) airline engineers and airline pilots during the service life of the airplane based on operator experience, available new functionality, route-specific configuration requirements, or other factors.

Below the header FLT PLN 102*a*, is the ACTIVE or MOD tab 104. The label ACTIVE is used when the plan being depicted is the active flight plan, and the label MOD is used when the plan being depicted is in the process of being modified to change the route or some aspect of the route. The ACTIVE or MOD tab 104 may display (1) a tabular flight plan list as in FIG. 5 or (2) a graphical flight plan as in FIGS. 8 and 9 where the graphical flight plan may display a lateral navigation display (ND) depiction, a vertical situation display (VSD) depiction, or a combined ND and VSD depiction. The reader is encouraged to refer to FIG. 8 in the following discussion of FIG. 5 as the graphical depiction is helpful in following the tabular flight plan.

Returning to FIG. 5 and the tabular flight plan therein, the flight plan is shown with (1) the list of rows 118, 120, 122, 124, 126, 128, 130, 132 designating the flight segments that constitute the flight plan along with (2) a list of columns 108, 110, 112, 114, that define the conditions or restrictions on the flight plan's segments. Thus, lateral navigation aspects of the flight plan are defined by the information shown in the lateral (LAT) column 108; vertical navigation aspects and associated vertical restrictions of the flight plan are defined by the information shown in the vertical (VERT) column 110; the speed profile aspects and speed restrictions of the flight plan are defined by the information shown on the SPEED column 112; and the time aspects and time requirements of the flight plan (e.g., required time of arrival (RTA) and/or estimated time of arrival (ETA)) are shown in the TIME column 114. ETA and RTA may be differentiated from each other by, for example, using colors or different size fonts; optionally both may be shown by placement above/below each other in the Time column 114, for example, ETA in the top field and RTA in the bottom field, as the time entry for each row has a two-field box. With the exception of distances between waypoints, all of the elements in the rows and columns may be activated by the pilots to display a modification tab-pane to enable updating of the values therein.

Other aspects of the flight plan such as vertical and lateral Required Navigation Performance (RNP) (not shown) may be accessed via the variable-access icons 106a and 106b. Variable-access icons 106c and 106d may also be used to scroll up and down the flight plan list to show a different rows or segment of the flight plan. Mechanical scrolling means (not shown) such as those on cursor control devices (CCD) or programmed scrolling means by, for example, by route procedures, by phase of flight, or other task-based collectors useful to the pilots may be implemented.

In some embodiments, variable-access icons 106a, 106b, 106c, and 106d may also be programmed to function as variable zooming means for zooming to show additional columns and/or additional rows with reduced font size such that pilots may zoom out to view a larger portion of the page and zoom back in to read the desired column(s) and make their desired selection. For example and without limitation, clicking and holding 106b may allow the pilot to zoom out to show additional columns while holding the waypoint information on the LAT 108 column constant. As another example, clicking and holding 106d may allow the pilot to zoom out to show additional rows while holding the column headings LAT 108, VERT 110, SPEED 112 and TIME 114 constant.

In addition, one or more access icons 106a, 106b, 106c, and 106d, may also be configured to show different views of the tab-pane. For example, if a tab-pane has 20 columns as part of a flight plan and the display can only show three columns at a time, wherein the columns may be related by a task or function such as (1) a group of three columns with relevant data for an arrival procedure or (2) a group of four columns with relevant data for an air-traffic-related procedure, access icons 106a and/or 106b may be programmed such that upon activation, they provide a drop down list for an "arrival procedure" view or an "air-traffic-procedure" view. Similarly, access icons 106c and/or 106d may be programmed to provide a drop-down list for selecting a view, for example, a view of the flight plan by phase of flight such as cruise phase of flight view or descent phase of flight view.

Another non-limiting example of variable-access means may be demonstrated in reference to FIG. 5. In addition to the advantages discussed immediately above, variable-access icons may be used by an airline or an airplane manufacturer to configure default views or other preferred views for their customers and pilots respectively. For example, variable-access icon 106a may be programmed such that, upon selection by a mouse click, it provides a drop-down list of optional views such as DEFAULT VIEW, SPEED VIEW, and SCHEDULE VIEW. The view provided in FIG. 5 may be considered a DEFAULT view showing the LAT 108, VERT 110, SPEED 112, and TIME 114 columns to show a more nominal view of the flight plan. SPEED VIEW may be programmed to show LAT 108 and SPEED 112 columns only to provide a simplified look-up of the speed schedule. SCHEDULE VIEW may be programmed to show a LAT 108 and TIME 114 columns only to provide quick access to the planned flight progress in terms of time. Additional views such as a REPORT VIEW or REMIND VIEW showing a LAT 108 column and a REPORT column (not shown) or REMIND column (not show) respectively indicating reporting or reminder points during the flight may be programmed to provide pilots quick access to all the reporting points or all the programmed reminders of the flight. Thus, for example, the flying pilot and non-flying pilot may configure different views of an operational tab-pane they deem most suitable for their respective tasks.

The advantages of such views are not limited to providing quick and task-oriented access to pilots. They also enable the flying and non-flying pilot as well as other cockpit crew (e.g., relief crew, pilot trainees, etc.) to utilize an LMI-FMIS 12 on any suitably configured cockpit device. For example, if an EFB 28 or a tablet computer can show only two columns, a two-column tab-pane view may be shown on such device whereas a larger display such as a Multi-Function Display 88 may show a four-column view. In this manner, the layered tab-pane architecture in general and the variable-access means in particular, impart flexibility and efficiency to pilots in reviewing, organizing, and managing flight management functions.

Continuing now to the rows shown in FIG. 5, below the column headers is row 116 which has information on the current (active) segment of the flight plan. Here, row 116 shows the following: (1) the airplane is on a course tracking 132 degrees; (2) the airplane has a current target altitude of 17,000 feet on this segment; (3) the airplane is flying on an economic speed of 291 knots; and (4) the Estimated Time of Arrival (ETA) at the next waypoint is 12:05:45. Next, row 118 shows the following: (1) the next waypoint in the flight plan is REYES, which is 33 NM away from the airplane's current position; (2) REYES is planned to be crossed at analtitude of 19,000 ft (FL190); (3) there is no speed restriction for REYES as indicated by the blank box in the SPEED 112 column for REYES, and thus the airplane will continue to fly at 291 KT; and (4) the Estimated Time of Arrival (ETA) at REYES is 12:12:33. The information on rows 116 and 118 is also substantially depicted in FIG. 8.

Flight plan information for the segment after REYES is shown in row 120. Here, row 120 shows the following: (1) PIRUE is 12 NM away from REYES; (2) the airplane should cross PIRUE at 17,000 ft to comply with the altitude crossing restriction; (3) there is no speed restriction at PIRUE and thus the airplane will continue to fly at 291 KT; and (4) the ETA at PIRUE is 12:16:46.

Information similar to the immediate discussion above is shown in rows 122, 124, 126, 128, 130, and 132, showing (1) distance from one waypoint to the next waypoint; (2) altitude restrictions, if any; (3) speed restrictions, if any; and (4) ETA and/or RTA at a waypoint. For example, waypoints PAULA and ILEAN have crossing restrictions of 250 KT and 230 KT as shown in rows 124 and 126 respectively. The nomenclatures "X at FLYYY" (read as cross waypoint at Flight Level YYY) or "X at 250 KT" (read as cross waypoint at speed of 250 knots) may be changed to any suitable nomenclature signifying the restriction at hand, and the examples shown are in no way intended be limiting. For example, an "AT or BELOW 250 KT" or a suitable short-hand may be displayed instead of "X at 250 KT" if the applicable restriction were to cross at or below 250 KT.

Next row 134 designates a point where the autopilot unlinks from the flight plan at 10,000 ft as indicated by the unlink indicator 134a. Row 134 indicates that 7 NM after WAKER, the airplane will reach the deceleration point to cross 10,000 ft at the required speed of 250 KT or less. Significant points in time, altitude, speed or other restrictions that may operate as a function of airspace requirement or procedural requirement may be interspersed in a similar manner at any point in the tabular flight plan list.

At the bottom of the active tab, are a number of control functions 138 for managing the flight plan. Similar arrangement of control functions is generally available at the bottom of other tabs as well. Generally, the control functions 138 may be used to manage the currently displayed tab; to search for a waypoint; to create a new waypoint, to make a discrete flight plan modification affecting one waypoint; to make a bundled flight plan modification affecting multiple waypoints; to erase or delete a pending flight plan modification; to execute a flight plan modification; to undo an executed flight plan modification; and to restore a previous state of a flight plan modification. Thus, control functions 138 enable pilots to access, manage, and update a flight plan via multi-indexed means that can be utilized to affect one or more aspects of a flight plan.

Moreover, control functions 138 enable the management of modification states where one or more modifications may affect one or more flight management functions. For example, the modification state may affect multiple waypoints and multiple restrictions. That is, unlike previous interfaces that are focused on allowing pilots to make modifications one at a time such as a particular modification at a waypoint, these functions, together with the overall tab-pane architecture, not only allow pilots to make such modifications but also enable pilots to manage pending modifications, including reviewing pending modifications, cancelling or quitting pending modifications, executing modifications, undoing executed modifications, and restoring previous modification states.

In this regard, control functions 138 enable pilots to manage pending modifications in singular or bundled forms; remove the need for the pilots to recall a previous flight plan modification state such as for example, a modification affecting multiple waypoint changes; and allow pilots to manage the task sequence as they see fit as opposed to being locked into a task sequence as a function of the modification at hand by storing in memory the pending, unexecuted, modification state. For example, if the previous modification introduced a route procedure that inserted three waypoints into the flight plan, selecting ERASE MODS 150 can erase the modification by deleting the three waypoints of the route procedure and restore the previous state. Similarly, multiple modifications such as, for example, insertion of a route procedure followed by an altitude restriction at a waypoint, can be removed from the modification sequence by ERASE MODS 150 if they were pending modifications or by UNDO EXECUTE 148, if they were executed modifications. Information on the executed or pending modification states may be suitably reflected on the ACTIVE 104 tab or by other assistance messages provided in pop-up mode.

Proceeding from left to right, the first control function is a RTE PROC selector 142, which upon selection will display a route procedure modification tab (not shown) from which a pilot can select a route procedure (e.g., departure, airway, holding pattern, approach, etc.) and manage the flight plan according to the route procedure. For example, brackets 136a and 136b show a set of waypoints defined by two route procedures—a first route procedure including REYES, PIRUE and FIM (e.g., an airway) and a second procedure including PAULA, ILEAN, WAK01, and WAKER (e.g., an arrival procedure). Thus, a pilot may, for example, select RTE PROC 142 to display a route procedure tab, select a new route procedure to replace the second route procedure, and update the flight plan to fly the new procedure.

Similarly, the NEW WPT 140 selector may be used to display a waypoint insertion tab to insert a new waypoint in the flight plan. The INTC AIRWAY selector 144 may be used to intercept an airway from a present position or insert an airway into the flight plan. The AT ALT selector 146 may be used to define a pseudo waypoint at an altitude. The ERASE MODS selector 150 may be used to erase pending modifications. The EXECUTE selector 152 may be used to execute pending modifications, and lastly, the UNDO/EXECUTE selector 148 may be used to undo the most recently executed modification and restore the previous modification state. The FIND/INSERT POINT selector 154 is a search function that accepts an arbitrary waypoint identifier such as WAKER or a latitude/longitude identifier and inserts it into the flight plan as a pending modification such that the pilots can see it on the ACTIVE 104 tab-pane, as well as the navigation display (ND) and vertical situation display (VSD). Lastly, currently blank or inoperative selectors such as 156a, 156b, and 156c may be activated to add new functionality related to one or more of (a) flight planning, (b) navigation, (c) performance, (d) guidance, and (e) datalink communication aspects of the airplane's capabilities depending on the airplane configuration or airline customer preferences.

Figure 8:
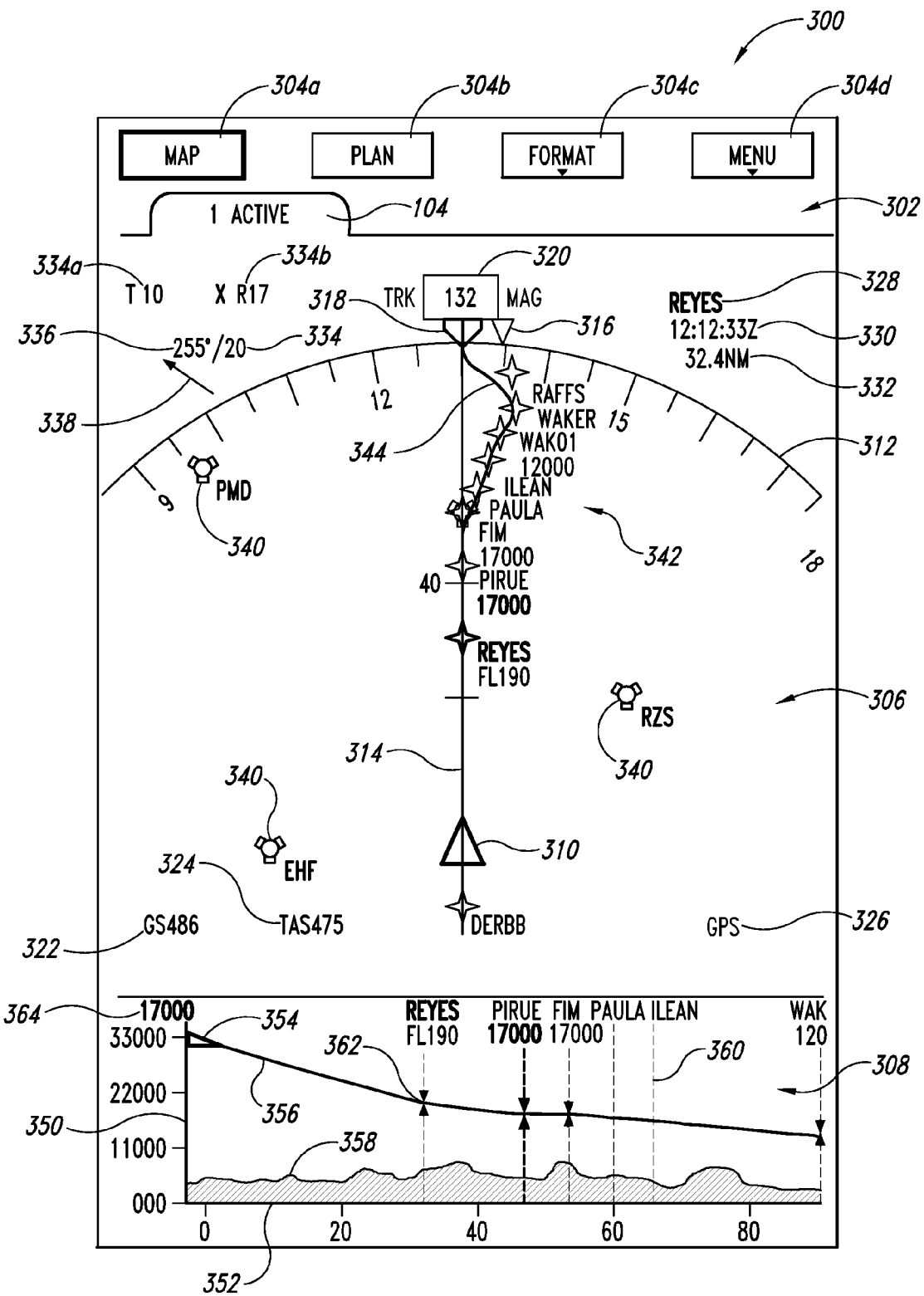
FIG. 8 is a diagram illustrating an operational tab-pane in graphical format.

Discussed earlier in this disclosure was the benefit of how the tab-pane based architecture leads a pilot through the task. This will now be demonstrated via an operational example using FIGS. 5-12. The active tabs of FIG. 5 and FIG. 8 are part of the first or operational layer of a tab-pane-based Layered Multi-indexed (LMI) FMIS. A pilot may use either one to view and manage the flight plan.

From one of the first layers, upon selection, the LMI-FMIS brings up a second layer, typically the modification layer 160 (FIG. 6), applicable to the selection made in FIG. 5 or FIG. 8. Optionally, it may simultaneously bring up a third layer, typically the information layer 200 (FIG. 7), applicable to the selection made in FIG. 5 or FIG. 8. In this example, selection of the WAKER waypoint in row 130 of FIG. 5 brings up two additional tab panes—(1) a WAKER MOD 162 tab-pane and (2) a WAKER INFO 164 tab-pane as shown in FIG. 6, with the WAKER MOD 162 tab-pane shown on top of the ACTIVE 104 and WAKER INFO 164 tab-panes.

From the tab-pane of FIG. 6, a pilot may now start to engage the set of modifications selectors 166 related to the WAKER waypoint using any of the modifications selectors 168, 170, 172, 174, 176, 178, 180, 182, 184, 186, 188, and 190, as well as get a quick view of the inbound course (159°) and outbound course (80°) into and out of WAKER using the north-up mini-map 192. If the pilot makes a modification related to WAKER, the pilot may execute the modification using the EXECUTE 198 selector. Optionally, a pilot may preview the modification prior to execution using the PREVIEW PLAN 196 selector, which upon selection, displays the preview on the first or operational layer tab pane, now labeled MOD (see e.g., FIG. 9, MOD(1) 372) to indicate that it depicts the modified flight plan, and which may present the preview in either graphical or tabular forms. If the pilot chooses not to continue with the modification, the pilot may select the QUIT TAB 194 selector and cancel the pending modification, remove from the display the WAKER MOD 162 tab-pane and the WAKER INFO 164 tab-pane, and return to the ACTIVE 104 tab-pane. At any time, the pilot has the option of switching tab-panes by selecting the ACTIVE/MOD first layer 104 tab-pane or the WAKER-INFO 164 tab-pane.

Turning now to the set of modification selectors 166, Table 1 provides a succinct description of the modification selectors some of which are further described with reference to FIGS. 10-12 further in the specification.

TABLE 1

| | |
|---|---|
| DIRECT TO (168) | Modify flight plan to fly direct to a waypoint WAKER |
| INTC CRS (170) | Modify flight plan to intercept a course inbound to or outbound from WAKER |
| MOVE (172) | Modify flight plan to move waypoint WAKER in the flight plan to a different point or segment |
| CROSS (174) | Modify flight plan to cross waypoint WAKER at one or more of a specific or range of (1) altitude(s); (2) speed(s); and (3) time(s). |
| DELETE (176) | Modify flight plan to delete waypoint WAKER from the flight plan |
| HOLD (178) | Modify flight plan to enter or manage a holding pattern relative to WAKER |
| OFFSET (180) | Modify flight plan define a track at either side of the flight plan; the modification defined in reference to WAKER |
| AFTER (182) | Modify flight plan after reaching a waypoint WAKER |
| STEP (184) | Modify flight plan to insert or change a step climb at waypoint WAKER |
| AIRWAY (186) | Modify flight plan to intercept an airway or insert it into the flight plan; the modification defined in reference to WAKER |
| ABEAM (188) | Modify flight plan to define a waypoint that is perpendicular to waypoint WAKER along the current track |
| RELATIVE TO WAYPOINT (190) | Modify flight plan to define a new flight plan point relative to waypoint WAKER, from which further modifications can be made |

Figure 10:
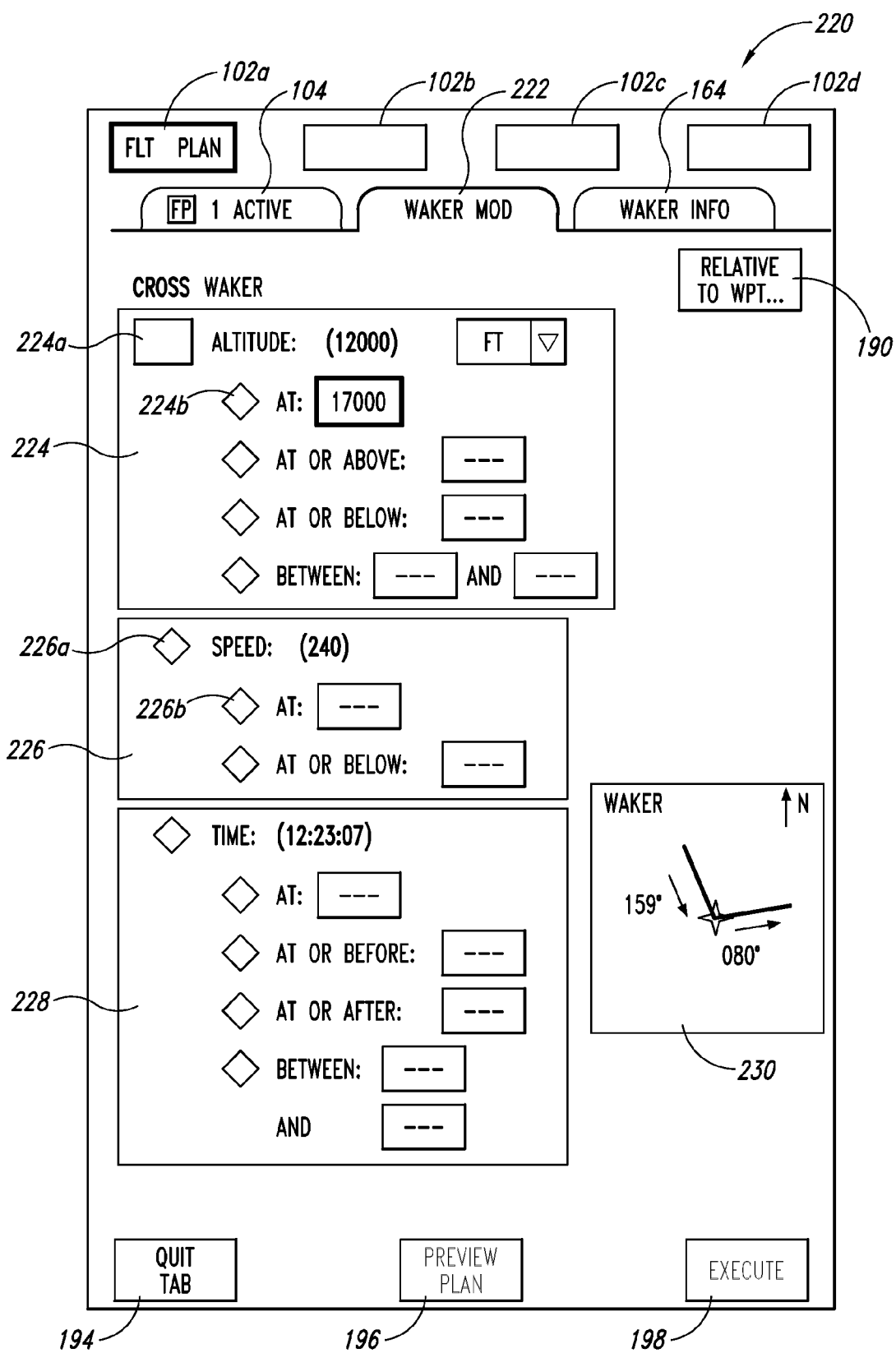
FIG. 10 is a diagram showing a modification tab-pane for modifying a flight plan to cross a waypoint at one or more of a specific or range of (1) altitude(s); (2) speed(s); and (3) time(s).
Figure 11:
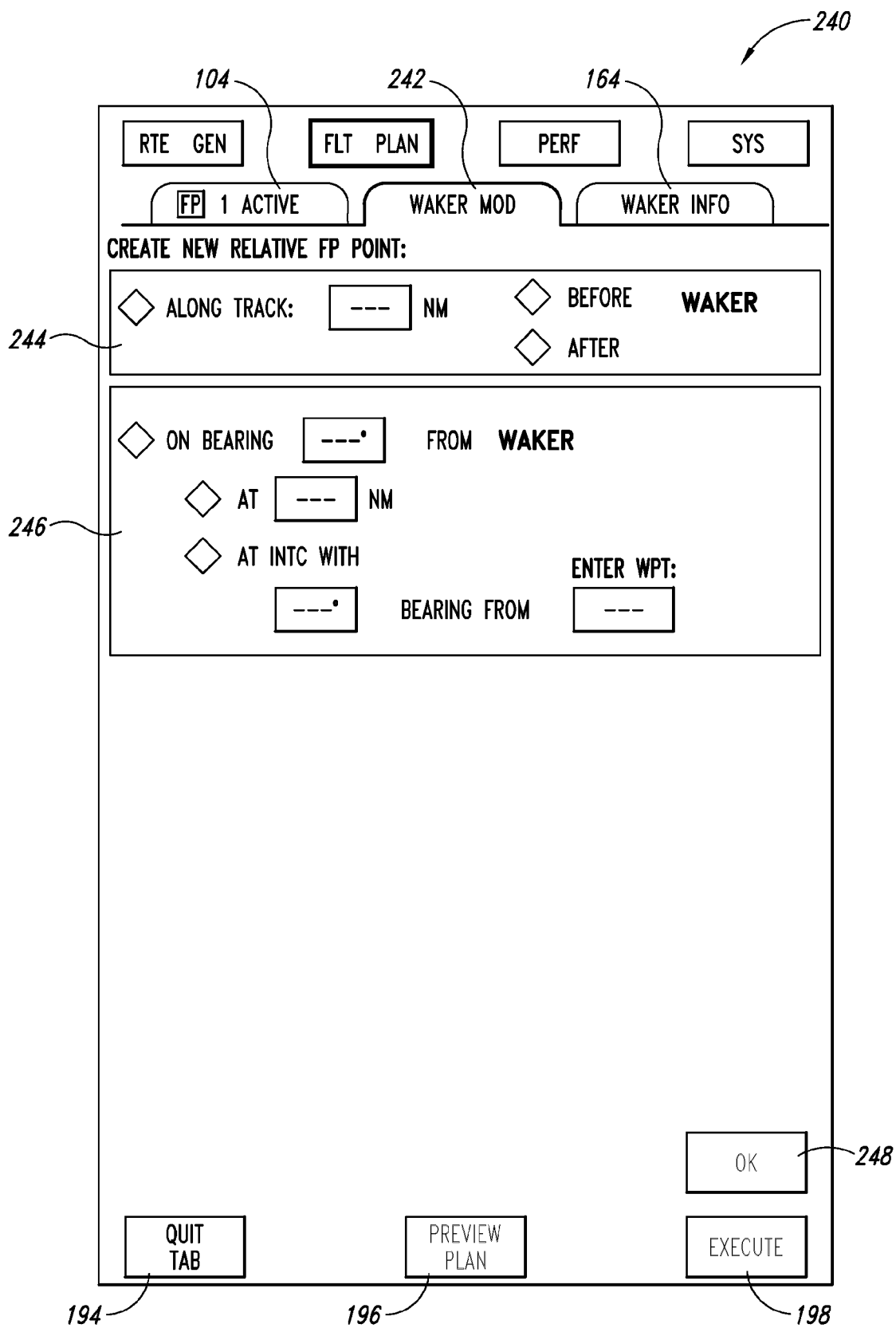
FIG. 11 is a diagram showing a modification tab-pane to define a new flight plan point relative to a given waypoint.
Figure 12:
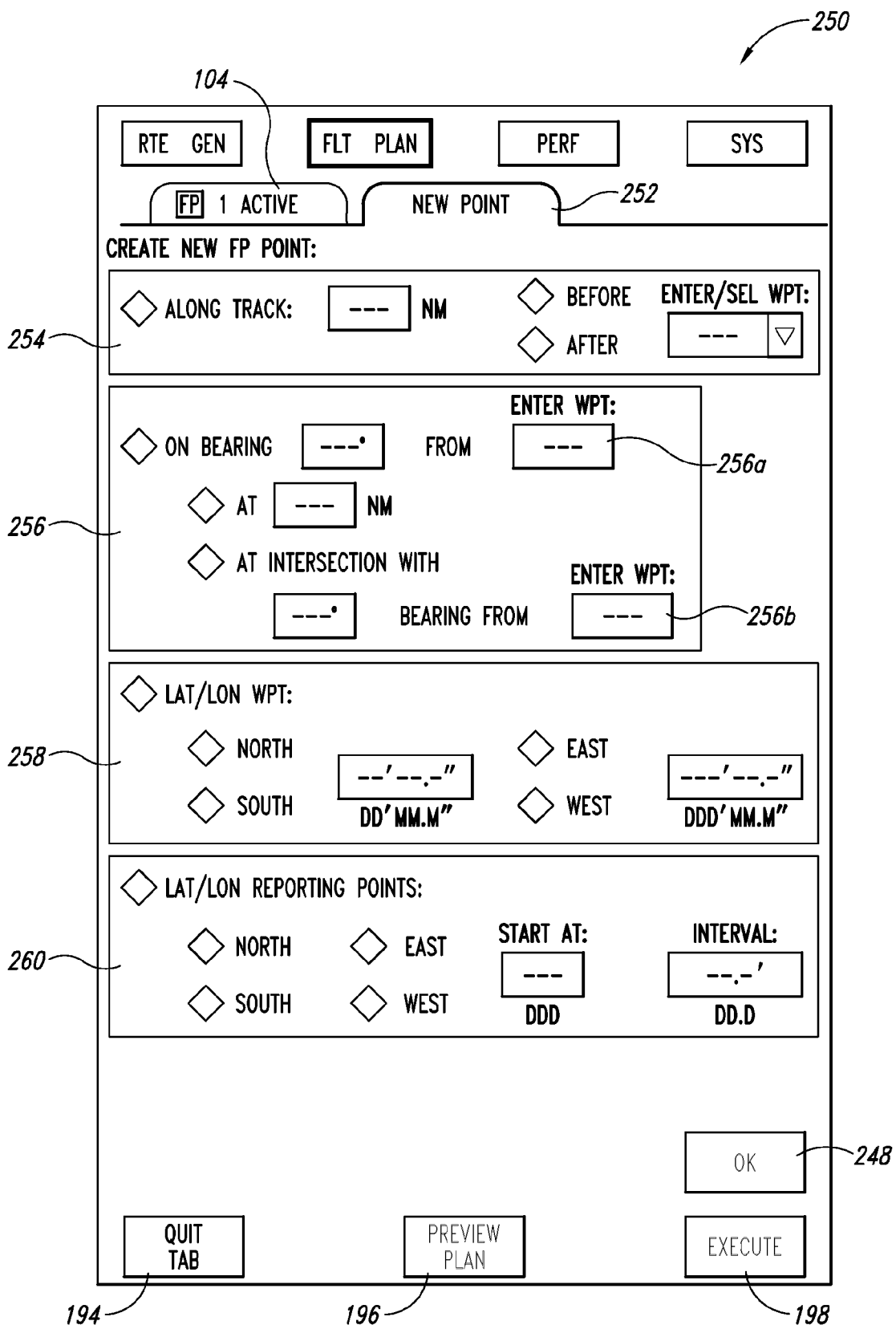
FIG. 12 is a diagram showing a modification tab-pane for inserting a new waypoint into the flight plan.

Upon selection of any one of modifications selectors 168, 170, 172, 174, 176, 178, 180, 182, 184, 186, 188, and 190, the WAKER MOD 162 tab-pane will display, depending on the selection, a tab-pane similar in nature to those shown in FIGS. 10-12 to provide options to the pilots to make the desired modifications. Those of ordinary skill in the art will appreciate that FIG. 6 depicts one preferred configuration of many that can be implemented to embody flight plan modification means. Other types of flight plan modification means can be similarly embodied and will not be repeated. All structurally similar depictions arranging the tab-panes and tailoring the available modification options as in FIG. 6 are within the scope of the disclosure. The person of ordinary skill in the art can apply the teachings of FIG. 6 and those of FIGS. 10-12 to embody similar depictions not only for flight plan modifications but also for other flight management functions.

From the modification tab-pane of FIG. 6, a pilot may display the information 200 layer of FIG. 7 by selecting WAKER INFO 160 tab-pane. Those of ordinary skill in the art will recognize that many types of waypoint related information may be presented on this layer and that the presentation here is only a non-limiting example of what may be presented. In some embodiments, the WAKER INFO 164 tab-pane may optionally have the full set of modification selectors 166 to enable direct access to a modification tab-pane. This is an example of the multi-index feature of the LMI-FMIS to optimally navigate the menu structure. For example, after having viewed the WAKER INFO 164 tab-pane and the predicted altitude information of WAKER reporting 12,000 ft, a pilot may select CROSS 174 to execute a modification to cross WAKER at 12000 ft without having to select the WAKER MOD 162 tab.

The WAKER INFO 166 tab-pane also has a geographic identifier 202 entailing information from the navigation database (NDB) and other sources such as the identifier, geographic location, country, and description of the waypoint in reference to the flight plan. Furthermore, flight plan parameters 204 related to the waypoint such as bearing to waypoint, distance to waypoint, predicted altitude at waypoint, ETA, fuel remaining at waypoint, inbound and outbound course at waypoint, and wind speed and direction at waypoint are available to the pilots. Also available is RNP information 206 such as lateral and vertical RNP for the inbound leg of the flight to the waypoint. Lastly, and optionally, a reminder function as depicted by the REMIND 210 selector to set reminders as a function of the waypoint under modification and a report function as depicted by the REPORT 212 selector to manually or automatically prepare and send a report as a function of the waypoint under modification may be available.

FIG. 8, as discussed earlier, depicts in a graphical 300 embodiment of the first or operational layer showing the flight plan with the waypoints shown in FIG. 5 in a navigation display (ND) 306 format and vertical situation display (VSD) 308 format in the ACTIVE 104 tab-pane. As various aspects of the ND and VSD are known to those of ordinary skill in the art, only a minimal description of the ND and VSD elements will be provided so as to avoid prolixity.

At the top are selectors 302 to manage the displayed graphical depiction. The MAP 304a selector displays the ND in map-mode (track-up view). The PLAN 304b selector displays the ND in plan-mode (north-up view). FORMAT 304c may provide display format options for pilots. And lastly, MENU 304d may provide pilots choices to configure the ND 306 format such as displaying airports, displaying terrain, or other information.

The ND in map-mode shows an own-ship symbol 310, expanded compass rose 312, a range scale 314, a current heading pointer 316, selected track 318, magnetic reference 320, ground speed 322, true airspeed 324, navigation source 326, active (next) waypoint 328, ETA to active waypoint 330, distance to active waypoint 332, wind speed 334, tail wind component 334a, crosswind component 334b, wind bearing 336, and wind direction indicator 338, and nearby VORTACs 340. Also shown are the waypoints with their associated altitude restrictions, if any.

The VSD 308 shows a vertical scale 350 depicting altitude, a horizontal scale 352 depicting distance, an own-ship symbol 354, the projected or planned flight path 356, and the terrain profile 358 along the projected or planned flight path. Waypoints 342 such as REYES, PIRUE, FIM, PAULA, ILEAN, WAK01 AND WAKER, are shown similarly on the VSD 308 with associated altitude restrictions, if any, and waypoint anchor lines 360 from the waypoints to the horizontal axis are also shown. Altitude constraints symbols 362, here constraints depicting "At Altitude"—meaning the airplane should cross at the specific altitude—are indicated by the triangles pointing at each other. The current target altitude of 17,000 ft set in the MCP 94 of FIG. 4 is shown in bold in the VSD, the ND, and also at the top of the vertical scale 364.

In addition to the information depicted in FIG. 8, FIG. 9 depicts a modification in progress 370 related to the waypoint WAKER. The ACTIVE 104 tab of FIG. 9 is now labeled MOD(1) 372 to indicate a modification is in progress. Furthermore, the WAKER MOD 162 and WAKER INFO 164 have now been activated so that the pilot may access the modification layer and the information layer for WAKER.

The waypoint WAKER 374 is depicted in larger font to further highlight the waypoint under modification. Lastly, a dashed line 376 from the own-ship symbol 310 to WAKER 374 is shown to indicate that the pending modification is to change the flight plan to fly direct to WAKER 374. In some embodiments, a similar dashed line 378 depicting the modified planned flight path on the VSD 308 may also be shown along with a corresponding change to the terrain profile 358 reflective of the terrain along the modified flight path.

Thus, LMI-FMIS provides a pilot means to get a more comprehensive picture of the flight plan, including its recent and pending modifications in a graphical format, with options to easily execute, revise, or cancel the modifications by accessing one or associated tab-panes. This helps pilots better understand the impact of flight plan changes and the reasons for the changes thus avoiding surprises and increasing awareness of overall performance of the airplane.

Returning to the description of FIG. 9, if the pilot were to select the WAKER INFO 164 tab, the WAKER INFO 164 tab as depicted in FIG. 7 is displayed. If the pilot were to select the WAKER MOD 162 tab, the WAKER MOD 162 tab as depicted in FIG. 6 is displayed. Depending on when in the task-sequence the pilot switched to the tab-pane shown in FIG. 9 to view the pending modification graphically, the WAKER MOD 162 tab may display a modification menu accessed by the DIRECT TO 168 selector as shown in FIG. 6.

Other non-limiting examples abound. For example, starting from FIG. 6, if the pilot selects the CROSS 174 selector, the WAKER MOD 222 tab of FIG. 10 is displayed. Here, the pilot may define three types of modifications for WAKER: (1) a crossing altitude at WAKER using the crossing altitude modification options 224; (2) a speed restriction using speed restriction modification options 226; and (3) a time constraint for setting RTA using time constraint modification options 228.

Selections for setting more than one condition such as altitude and speed or altitude and time may be made by selecting the altitude checkbox 224a and radio buttons such as 224b and radio buttons 226a, 226b for speed. Selection of both speed and time simultaneously is blocked out as both conditions cannot be met simultaneously.

The checkbox 224a selection allows further selection using radio buttons for altitude restrictions. Only one selection of a radio button with a set of modification options is permitted. For example, for the crossing altitude modification options 224, a pilot may select radio buttons to set a restriction (1) at a particular altitude; (2) at or above a particular altitude; (3) at or below a particular altitude; or (4) between two altitudes. After selecting a radio button, the pilot may input a value (or make a selection from a drop-down list) in the corresponding field of the radio button. All of the checkboxes and radio buttons depicted in the figures of this disclosure work in a similar fashion.

After making the modification related to WAKER, the pilot may execute the modification using the EXECUTE 198 selector. Optionally, a pilot may preview the modification prior to execution using the PREVIEW PLAN 196 selector, which upon selection, displays the preview on the MOD(1) 372 (see e.g., FIG. 9) tab-pane that may present the preview in either graphical or tabular forms. If the pilot chooses not to continue with the modification, the pilot may select the QUIT TAB 194 selector and cancel the pending modification, remove from the display the WAKER MOD 162 tab-pane and the WAKER INFO 164 tab-pane, and return to the ACTIVE 104 tab-pane. At any time, the pilot has the option of switching tab-panes by selecting the MOD(1) 372 tab-pane or the WAKER-INFO 164 tab-pane.

Another example of the set of modification selectors 166 of FIG. 6 is the RELATIVE TO WPT 190 selector. If the pilot selects the RELATIVE TO WPT 190 selector, the WAKER MOD 162 tab of FIG. 6 changes to the WAKER MOD 242 tab of FIG. 11 depicting the relative waypoint modification options 240. Here, the pilot may define two types of new positions relative to WAKER: (1) an ALONG TRACK 244 option defining a new waypoint along the current track at a certain distance before or after waypoint WAKER; and (2) an ON BEARING option 246 defining a new waypoint on a bearing from WAKER at a certain distance or at the intersection of two bearings from two different waypoints, one of which being WAKER. Selecting OK 248 completes the creation of the waypoint but does not change the flight plan. QUIT TAB 194, PREVIEW PLAN 196, and EXECUTE 198 work in the same way as discussed above.

Turning now to FIG. 12, the last non-limiting example is discussed. The waypoint creation modification options 250, accessed via the NEW WPT 140 selector shown in FIG. 5 are depicted in a modification tab-pane identified as a NEW POINT 252. Here, the pilot may define five types of new waypoints: (1) an ALONG TRACK 254 option defining a new waypoint along the current track at a certain distance before or after waypoint on the current plan to be selected from a drop-down list under the ENTER/SEL WPT header; (2) an ON BEARING option 256 defining a new waypoint on a bearing from a first waypoint 256a at a certain distance; (3) an ON BEARING option 256 defining a new waypoint at the intersection of two bearings from two different waypoints, the first being 256a and the second, 256b; (4) a LAT/LONG WPT 258 option defining the waypoint by latitude and longitude; and (5) a LAT/LONG REPORTING POINTS 260 option defining a set of waypoints at intervals of latitude or longitude as they are crossed along the route, typically used for fuel monitoring or position reporting. Selecting OK 248 completes the creation of the waypoint but does not change the flight plan. QUIT TAB 194, PREVIEW PLAN 196, and EXECUTE 198 work in the same way as discussed above.

Those of ordinary skill in the art will appreciate that the information supporting flight plan management comes from various sources on board the aircraft. By the way of example, and without limitation, waypoint information may come from the Flight Management System (FMS) 14 and the Navigation System 22. Standard speed restrictions may come from an uplink from Air Traffic Control via the Communications System 24, optionally routed via the Flight Management System 14. Configuration-based speed restrictions may come from the Aircraft Control System 20, the Flight Management System 14, or other systems that provide configuration information. Speed restrictions that operate as a function of Air Traffic Management (ATM) applications may also come from a number of systems including the Surveillance System 26 or other systems such as the Electronic Flight Bag (EFB) 28 that may host an ATM application. Speed restrictions that become operative when the flight crew engages a flight procedure such as noise abatement may be provided by the Flight Management System (FMS) 14. Lastly, crew-entered speed restrictions may come from the MCP 94, an FMS 14 function, or the LMI-FMIS 12 speed profile control inputs 126.

As shown in FIGS. 5-9, the LMI-FMIS 12 brings together flight-plan-relevant information available from the various sources shown in FIG. 1 into a well-integrated, and simplified tab-pane-based tool. Thus, changes in the flight plan can concisely and clearly be reflected by tabular and graphical depictions of the LMI-FMIS 12. In this manner, pilots can look to one device and gain a very clear picture of the flight plan of the current phase of flight, make modifications to a flight plan, preview modifications to a flight plan, implement modifications, and cancel or undo modifications as needed to meet their performance objectives.

Yet another benefit of the LMI-FMIS 12 is the interactive input and control capability that is integrated with graphical NDs and VSDs. Pilots gain immediate graphical feedback by switching to different tab-panes as they prepare modifications to the flight plan on a modification tab-pane. In large format displays (e.g., horizontally arranged landscape format), one could show both the modification tab-pane and the graphical tab-pane side-by-side, thus eliminating the need for switching tabs, such that the modifications made on the modification tab-pane can be viewed substantially simultaneously on the graphical tab-pane.

Furthermore, as there may be at least two LMI-FMIS 12 in the flight deck with cross-talk to enable sharing of modification information in real-time, the modification entered on the modification tab-pane of, for example, the non-flying pilot, may be immediately displayed on the active tab-pane of the flying pilot should the flying pilot choose to display the active tab-pane depicting the ND and VSD as in FIGS. 8-9. In this manner, the LMI-FMIS enables pilots to collaborate further, communicate better, and improve flight deck efficiency by allowing one pilot to view and comprehend the pending modification prepared by another pilot.

Figure 13:
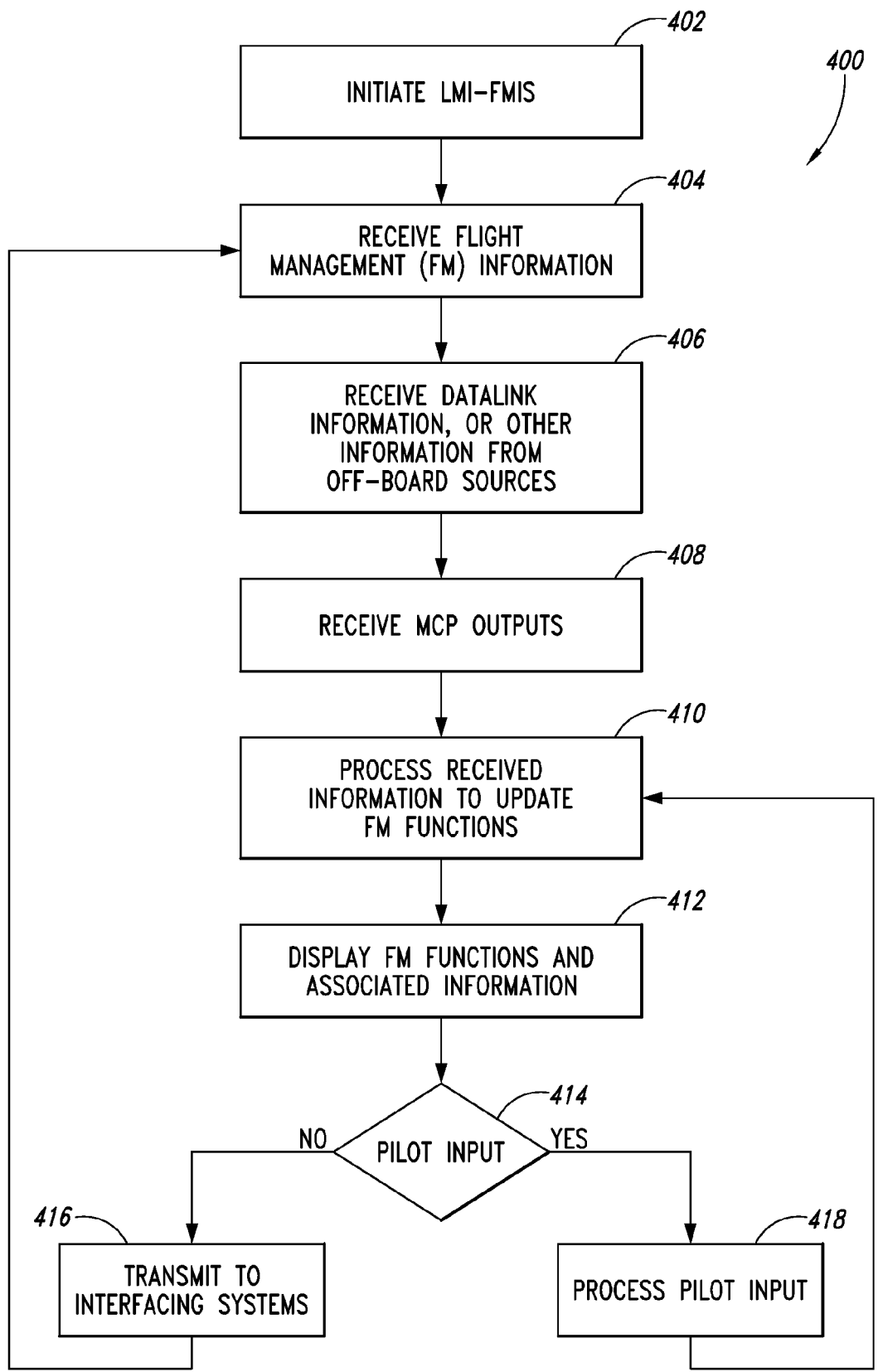
FIG. 13 is a flow chart of an example of a method by which an advantageous embodiment of the disclosure may be implemented.

FIG. 13 depicts a general method 400 by which the disclosure may be implemented. The display of graphical information on display systems such as those utilized by pilots in a modern aircraft display system, including the storage and retrieval of certain information such as approach procedures in support of flight displays, have been previously implemented in industry. Those skilled in the art would understand how the placement of display symbology as well as storage and retrieval of approach procedures would be accomplished on aircraft systems, and that the depiction herein is one of several possible methods of displaying symbology.

It should be appreciated that the logical operations described herein are implemented (1) as a sequence of computer implemented acts or program modules running on a computing system such as a Flight Management Computer (FMC) and/or (2) as interconnected machine logic circuits or circuit modules within the computing system. The implementation is a matter of choice dependent on the performance and other requirements of the computing system. Accordingly, the logical operations described herein are referred to variously as steps, operations, or acts. These states, operations, or acts may be implemented in software, in firmware, in special purpose digital logic, and any combination thereof. It should also be appreciated that more or fewer operations may be performed than shown in the figures and described herein. These operations may also be performed in a different order than those described herein.

As will be appreciated by one of skill in the art, the present disclosure may be embodied as a method, system, apparatus, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Now referring to FIG. 13, first, a pilot initiates the LMI-FMIS 402. Alternatively, an on-board computer may automatically initiate the LMI-FMIS 12 as a function of phase of flight or other suitable context-sensitive criterion. This initiation step may entail simply turning on the system; choosing the LMI-FMIS 12 from a plurality of available cockpit applications; making or confirming a plurality of selections via a control input device 16; or providing the LMI-FMIS 12 additional information from another system such as the Flight Management System (FMS) 14, the Navigation System 22, the Communication System 24, or the Surveillance System 26.

Next, the LMI-FMIS 12 receives FM-related information 404 such as the aircraft's state information including current flight operating parameters, flight plan information, and aircraft intent information including information pertaining to what the aircraft is commanded to do at a later time. The order of reception is not critical. The reception process is continuous until stopped; thus the system is continuously updated with the latest data elements. Such information is typically provided via digital data bus from each onboard system providing input to the LMI-FMIS 12. This is done today on many types of modern jet aircraft such as the Boeing 777 and the person skilled in the art would understand how such reporting is implemented.

The LMI-FMIS 12 receives flight plan information and other data such as origin and destination airports, waypoints, and alternate flight plans from the Flight Management System (FMS) 14, its Navigation Database (NDB), its Aerodynamic and Engine databases (AEDB), or another suitable system or subsystem.

Furthermore, the LMI-FMIS 12 receives various types of information from off-board sources 406 via its interfacing systems as shown in FIG. 1. For example, it may receive communication (datalink) information from the Communication System 24 or another suitable subsystem. It may also receive traffic information from the Surveillance System 26, for example, airplanes in the vicinity with whom the pilot is coordinating one or more of the airplane's dynamic parameters such as speed and separation distance. With respect to information from off-board sources, it is important to note that lack of some or all of this information may not necessarily hamper functionality defined in subsequent steps. For example, if datalink information is not available or not required, the method may continue to step 408.

In Step 408, the LMI-FMIS 12 receives information related to flight guidance and/or autopilot modes and commands from the Mode Control Panel (MCP) 94.

In Step 410, the LMI-FMIS 12 processes the received information, calculates changes to the FM functions of the airplane based on some or all of the aforementioned received information in Steps 404-410, and processes the FM functions for display on the applicable tab-panes. For example, first information as described earlier in the disclosure is processed for display in a first layer, operational tab-pane. Second information such as information for a second layer modification tab-pane is processed for display in a modification tab-pane.

In Step 412, the LMI-FMIS 12 displays information processed in step 410 on a suitable cockpit display in a manner substantially similar to what is displayed in FIGS. 5-12. First information such as a flight plan may be displayed in an operational tab-pane. The method may also display second information such as information that may be utilized in making a modification (e.g., selectable list of arrival procedures, list of waypoints, etc.) in a modification tab-pane. In addition, it may also display third information such as descriptive data, predictive data, or planning data in the third, information tab-pane.

In Steps 414, the method monitors for any pilot input such as those made via modification tab-panes affecting flight management functions, as well as the reporting of the flight management functions on the displays. If no pilot input is detected, the method proceeds to step 416 where it transmits the processed flight management information to interfacing systems shown in FIG. 1 such as the Aircraft Control System 20 and the Flight Management System (FMS) 14 to manage the flight path or performance of the airplane 42 in real-time or at a later point in the flight. The method then loops back to Step 404 and continues to receive, process, and display the most current information for display on the applicable tab-panes.

In Step 414, if the method receives pilot input related to flight management and/or the reporting of the flight management functions on the displays, the method processes the pilot input and loops back to Step 410 to update the flight management functions. The updates are then displayed and transmitted per Steps 412-416.

It is important to note that aspects of the method can be made to be context-sensitive. For example, the tab-panes can be brought up in automatic mode whenever the airplane is transitioning from one phase of flight to another or as a function of the REMIND 210 or REPORT 212 functions as described in FIG. 7. By the way of example, and not limitation, the ACTIVE 104 tabular format of FIG. 5 may be automatically switched to that of FIG. 8 when the aircraft enters a different phase of flight such as a descent phase of flight. Yet another example of context-sensitivity is the display of tabular flight plan list of FIG. 5 automatically if the airplane receives an uplink to modify the flight plan.

The method can also be used in a preview planning mode. In the preview planning mode, a subset of the steps, such as steps 402-412, can be utilized whereas in the active mode all steps, such as steps 402-418, may be utilized. By the way of example and not limitation, a preview mode may admit a pending modification to be displayed on the ND and VSD such that the pilots can pictorially understand the impact of the modifications. The pilots may then return to the modification tab-pane such as that shown in FIG. 6 and select QUIT TAB 194 to undo the modification or select EXECUTE 198 to implement the modification.

The subject matter described above is provided by the way of illustration only and should not be construed as limiting. While preferred embodiments have been described above and depicted in the drawings, other depictions of data tags and graphics symbology can be utilized in various embodiments of the disclosure. Graphical symbology may be used in place of text-based indications. Measurement units such as feet, meters, or miles may be suitably changed as appropriate for the task, custom, or convention. Lastly, the nomenclature, color, and geometric shape of the display elements can be varied without departing from the scope of the disclosure as defined by the appended claims.

We claim:

1. A task-oriented method of organizing a flight management interface system, the method activating a plurality of tabs associated with flight management tasks, comprising:
    displaying a first tab-pane comprising operational information associated with a plurality of flight management tasks;
    responsive to a first event, wherein the first event is one of a pilot input or a system input, activating a second tab-pane comprising of a plurality of modification options for at least one flight management task;
    activating a third tab-pane comprising information related to the flight management task presented in the first tab-pane wherein the information comprises at least one of descriptive data, predictive data, and planning data;
    responsive to a second event, wherein the second event is one of a second pilot input or a second system input to a plurality of modification fields of at least one of the modification options, storing a pending modification for the flight management task for at least one of a review step or an execution step; and
    responsive to a third event, wherein the third event is a pilot input, executing the pending modification.

2. The method of claim 1 wherein the operational information of the first tab-pane is presented in at least one of a tabular format and a graphical format.

3. The method of claim 1 wherein a modification made from the second tab-pane updates at least one flight management task in the first tab-pane.

4. The method of claim 1 wherein storing a pending modification further includes means for cancelling at least one pending modification.

5. The method of claim 1 wherein storing a pending modification further includes means for activating at least one reminder associated with the pending modification.

6. The method of claim 1 wherein storing a pending modification further includes means for reporting information associated with the pending modification.

7. The method of claim 1 further comprising providing a variable-access means for defining views of the first tab-pane.

8. A system for a flight management interface comprising:
    a computer having instructions having contents that perform a method that includes:
        configuring a plurality of flight management functions in a first tab-pane;
        configuring a plurality of modification options for the flight management functions in a second tab-pane;
        configuring a third tab-pane comprising information related to the flight management functions presented in the first tab-pane wherein the information comprises at least one of descriptive data, predictive data, and planning data; and
    a display operatively coupled to the computer to display the first tab-pane and the second-tab pane; and
    a control input device operatively coupled to the display to provide pilot input for the flight management functions and the modification options.

9. The system of claim 8 wherein the second tab-pane activates upon selection of a flight management function of the first tab-pane.

10. The system of claim 8 wherein a modification made from the second tab-pane updates at least one flight management function in the first tab-pane.

11. The system of claim 8 wherein the second tab-pane deactivates upon at least one of an execution of a modification or a cancellation of a modification.

12. The system of claim 8 wherein the plurality of flight management functions of the first tab-pane is presented in at least one of a tabular format or a graphical format.

13. The system of claim 8 wherein the display further comprises a variable-access means for defining views of the first tab-pane.

14. The system of claim 8 operatively connected to aircraft systems including a flight management system, an aircraft control system, a navigation system, and a communication system.

15. A computer-implemented method of managing modification states of aircraft flight management functions, the method comprising:
    displaying a first tab-pane comprising operational information associated with a plurality of flight management functions;
    responsive to a pilot input to modify at least one flight management function, activating a second tab-pane of a plurality of modification options for making at least one pending modification for the at least one flight management function;
    activating a third tab-pane comprising information related to the flight management task presented in the first tab-pane wherein the information comprises at least one of descriptive data, predictive data, and planning data;
    storing the at least one pending modification in memory;
    updating the first tab-pane with the at least one pending modification for at least one of a review step or an execution step; and
    responsive to a third event, wherein the third event is a pilot input, executing the at least one pending modification to cause a change in at least one of a flight path or a performance of an aircraft.

16. The computer-implemented method of claim 15 further comprising, cancelling the at least one pending modification in the review step.

17. The computer-implemented method of claim 15 further comprising, cancelling the at least one executed modification.

18. The computer-implemented method of claim 15 wherein the operational information of the first tab-pane is presented in at least one of a tabular format and a graphical format.

* * * * *